(12) United States Patent
Slivka et al.

(10) Patent No.: US 6,618,768 B2
(45) Date of Patent: Sep. 9, 2003

(54) METHOD AND COMPUTER SYSTEM FOR INTEGRATING A COMPRESSION SYSTEM WITH AN OPERATING SYSTEM

(75) Inventors: Benjamin W. Slivka, Clyde Hill, WA (US); Charles A. Strouss, III, Redmond, WA (US); Scott D. Quinn, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/201,791

(22) Filed: Jul. 24, 2002

(65) Prior Publication Data

US 2003/0023772 A1 Jan. 30, 2003

Related U.S. Application Data

(62) Division of application No. 08/140,753, filed on Oct. 21, 1993, now Pat. No. 6,453,363.

(51) Int. Cl.$^7$ ............................................. G06F 13/10
(52) U.S. Cl. ........................ 709/327; 710/68; 710/8
(58) Field of Search .......................... 713/1, 2, 100; 709/321–327; 710/68, 8

(56) References Cited

U.S. PATENT DOCUMENTS

| | | | |
|---|---|---|---|
| 5,136,711 A | 8/1992 | Hugard et al. ................ | 713/2 |
| 5,136,713 A | 8/1992 | Bealkowski et al. .......... | 713/2 |
| 5,210,875 A | 5/1993 | Bealkowski et al. .......... | 713/2 |
| 5,265,252 A | 11/1993 | Rawson, III et al. ....... | 709/326 |
| 5,291,585 A | 3/1994 | Sato et al. .................... | 710/10 |
| 5,355,498 A | 10/1994 | Provino et al. ............... | 713/2 |
| 5,410,699 A | 4/1995 | Bealkowski et al. .......... | 713/2 |
| 5,414,850 A | 5/1995 | Whiting ...................... | 709/321 |
| 5,418,918 A | 5/1995 | Vander Kamp et al. ....... | 713/2 |
| 5,448,741 A | 9/1995 | Oka ............................. | 713/2 |
| 5,542,082 A | 7/1996 | Solhjell ...................... | 711/115 |
| 5,557,799 A | 9/1996 | Welman ...................... | 713/2 |

OTHER PUBLICATIONS

Dykhuis, Randy, "Compression with Stacker and DoubleSpace," Computers in Libraries, 13(5):27–29, 1993.
Mitchell, Stan, "Building Device Drivers: Routines and Modules to Help Write Customized Character Device Drivers," PC Tech Journal, 3(5):76–95, 1985.
Employees of Microsoft Corp.; MS Dos 5.0; Microsoft Press, 1991.
DR DOS 6.0 User Guide, Digital Research, Inc., Monterey, California, Second Edition; Aug. 1991, pp. 471–479.
Netware 4.0 Getting Started with Netware 4.0, Novell, Inc., Provo, Utah, Mar. 1993, pp. I–vii, 5–6.
NetWare 4.0 Installation and Upgrade, Novell, Inc., Provo Utah, Mar. 1993. Pp I–viii, 39–40.

Primary Examiner—St. John Courtenay, III
(74) Attorney, Agent, or Firm—Joseph R. Kelly; Westman, Champlin & Kelly, P.A.

(57) ABSTRACT

The present invention provides a method in a computer system of integrating a compression system with an operating system. The computer system preferably comprises at least a memory device and one storage device. A user-supplied device driver is provided for storage devices that are not supported by the computer system to enable the computer system to communicate with the storage devices. In response to initialization of the computer system, the operating/compression system is loaded into the memory device and begins executing before any user-supplied device drivers are loaded into the memory device. Any compressed volume files located on the computer system are assigned drive letters at this time. When the user-supplied device drivers are loaded into the memory device, drive letters are assigned to the various storage devices. A drive letter conflict resolution scheme is provided to resolve conflicts that occur when the operating system attempts to assign a drive letter. The compression system assigns drive letters to compressed volume files (in the case where a compressed drive is created from free space on an existing drive) or to host drives (in the case where the contents of an existing drive are compressed).

11 Claims, 20 Drawing Sheets

| | A: | B: | C: | D: | E: | F: | G: | H: | I: | J: | PML | | | Letter Bottom | Reserved Drives |
|---|---|---|---|---|---|---|---|---|---|---|---|---|---|---|---|
| 00 | FD | FD | FD | | | | | | | | | | | | 5 |
| 01 | FD | FD | HD | CR | CR | CR | CR | CR | | | CVF0 (H,C,0) | CVF1 (D,C,1) | CVF2 (E,C,2) | D | |
| 02 | FD | FD | CVF0 | CR | CR | CR | CR | HD | | | CVF1 (D,C,1) | CVF2 (E,C,2) | | D | |
| 03 | FD | FD | CVF0 | CVF1 | CR | CR | CR | HD | | | CVF2 (E,C,2) | | | D | |
| 04 | FD | FD | CVF0 | CVF1 | CVF2 | CR | CR | HD | | | | | | D | |
| 05 | FD | FD | CVF0 | CVF1 | CVF2 | CR | CR | HD | RD1 | | | | | D | |
| 06 | FD | FD | CVF0 | RD1 | CVF2 | CR | CR | HD | CVF1 | | | | | E | |

Fig. 11

|    | A: | B: | C:   | D:  | E:   | F: | G: | H: | I:   | J:   | PML | | | Letter Bottom | Reserved Drives |
|----|----|----|------|-----|------|----|----|----|------|------|-----|---|---|---|---|
| 00 | FD | FD | HD   | RD0 |      |    |    |    |      |      |     |   |   |   |   |
| 01 | FD | FD | HD   | RD0 | CR   | CR | CR | CR | CR   |      | CVF0 (H,C,0) | CVF1 (I,C,1) | CVF2 (E,C,2) | E | 5 |
| 02 | FD | FD | CVF0 | RD0 | CR   | CR | CR | HD | CR   |      | CVF1 (I,C,1) | CVF2 (E,C,2) | | E | |
| 03 | FD | FD | CVF0 | RD0 | CR   | CR | CR | HD | CVF1 |      | CVF2 (E,C,2) | | | E | |
| 04 | FD | FD | CVF0 | RD0 | CVF2 | CR | CR | HD | CVF1 |      |     |   |   | E | |
| 05 | FD | FD | CVF0 | RD0 | CVF2 | CR | CR | HD | CVF1 | RD1  |     |   |   | E | |
| 06 | FD | FD | CVF0 | RD0 | RD1  | CR | CR | HD | CVF1 | CVF2 |     |   |   | F | |

*Fig. 12*

| | A: | B: | C: | D: | E: | F: | G: | H: | I: | J: | K: | PML | | | Letter Bottom | Reserved Drives |
|---|---|---|---|---|---|---|---|---|---|---|---|---|---|---|---|---|
| 00 | FD | FD | HD | RD0 | | | | | | | | | | | | |
| 01 | FD | FD | HD | RD0 | CR | CR | CR | CR | CR | | | CVF0 (H,C,0) | CVF1 (F,E,1) | CVF2 (G,C,2) | E | 5 |
| 02 | FD | FD | CVF0 | RD0 | CR | CR | CR | CR | CR | | | CVF1 (F,E,1) | CVF2 (G,0,2) | | E | 5 |
| 03 | FD | FD | CVF0 | RD0 | CR | CR | CVF2 | HD | CR | | | CVF1 (F,E,1) | | | E | |
| 04 | FD | FD | CVF0 | RD0 | CR | CR | CVF2 | HD | CR | RD1 | | CVF1 (F,E,1) | | | E | 5 |
| 05 | FD | FD | CVF0 | RD0 | RD1 | CR | CVF2 | HD | CR | CR | | CVF1 (F,E,1) | | | E | |
| 06 | FD | FD | CVF0 | RD0 | RD1 | CVF1 | CVF2 | HD | CR | CR | | CVF1 (F,E,1) | | | F | |
| 07 | FD | FD | CVF0 | RD0 | RD1 | CVF1 | CVF2 | HD | CR | CR | RD2 | | | | | |
| 08 | FD | FD | CVF0 | RD0 | RD1 | RD2 | CVF2 | HD | CR | CR | CVF1 | | | | F | |

*Fig. 13*

METHOD AND COMPUTER SYSTEM FOR INTEGRATING A COMPRESSION SYSTEM WITH AN OPERATING SYSTEM

The present application is a Divisional of and claims priority of U.S. patent application Ser. No. 08/140,753, filed Oct. 21, 1993, now U.S. Pat. No. 6,453,363 the content of which is hereby incorporated by reference in its entirety.

TECHNICAL FIELD

This invention relates generally to a computer method and system for device driver management, and more particularly, to a computer method and system for integrating a compression system with an operating system.

BACKGROUND OF THE INVENTION

As a general rule of thumb, a user of a computer system will eventually run out of secondary storage space. Therefore, it is always desirable to have new methods of increasing a secondary storage volume's storage capacity. One traditional method of increasing a volume's storage capacity is manually directing the operating system to delete unnecessary data from the volume, thereby freeing space for new data. This method is undesirable because often a user will make a hasty decision about what data should be deleted and then regret that decision later. Additionally, sometimes all of the data on a volume may be important so as to preclude their deletion.

Another method of increasing the storage capacity of a file-based volume is compressing individual files and storing the compressed files on the volume. Drawbacks of this method include the requirement that users must explicitly compress a file to save space, and must explicitly decompress a file before it can be used.

Yet another method of effectively increasing the storage capacity of a file-based volume is dynamically compressing files, storing the compressed files, and then decompressing the files as they are retrieved. Compression systems utilizing this method have typically taken the form of an add-on package to an operating system. These compression systems are typically installed as a device driver with a drive letter assigned. The compression systems typically store the compressed files in a "compressed volume." The compressed volume is a single file (a "compressed volume file") stored on a host volume along with other files or directories. A compressed volume is treated as a logical volume with its own device driver through which the compressed volume file is accessed. Like other volumes in the computer system, each compressed volume and host volume is assigned a unique drive letter (e.g., A, B, C, and so on). Thus, if a compressed volume file is stored on a host volume that is assigned drive letter D, and the compressed volume is assigned to drive letter E, then references to drive letter E will access the files stored in the compressed volume file that is itself stored on the host volume with drive letter D.

FIG. 1 is a block diagram of a conventional computer system 100. The computer system 100 comprises a read-only memory (ROM) device 101, a central processing unit (CPU) 104, a removable volume drive 105 (i.e., a floppy disk drive), a fixed volume drive 106 (i.e., a hard disk drive), and a random access memory (RAM) device 107. A boot program 102 and a basic input/output system (ROM-BIOS) 103 are stored on the ROM device 101. An operating system 110, such as MS-DOS 5.0 by Microsoft Corporation, is shown stored on the fixed volume, but can also be stored on the removable volume.

The installing of device drivers, such as compression drivers, typically occurs during system initialization. During system initialization, the operating system installs device drivers for both standard and non-standard devices that are specific to the particular hardware configuration of the computer system. For example, standard devices are typically two floppy disk drives and a hard disk drive. The device drivers for these standard devices are included with and installed automatically by the operating system. In MS-DOS, these standard device drivers are referred to as IO.SYS drivers. If a computer system includes non-standard devices, such as a CD-ROM drive, then a device driver for each non-standard device is specified in a configuration file. In MS-DOS, this file is named "CONFIG.SYS." The CONFIG.SYS file is a user-configurable text file containing commands that are executed each time the computer system is initialized. The commands instruct the operating system how to handle certain operations and devices. For each non-standard device, a user supplies a device driver and specifies it in the CONFIG.SYS file to enable the operating system to install the appropriate device driver. Table 1 contains sample commands commonly found in the CONFIG.SYS file.

TABLE 1

| |
| --- |
| DEVICE = RAMDRIIVE.SYS |
| DEVICE = CDROM.SYS |
| DEVICE = SCSI.SYS |
| FILES = 40 |
| BREAK = ON |
| LASTDRIVE = E |
| BUFFERS = 20 |
| SHELL = C:\DOS\COMMAND.COM /P /E:256 |
| DEVICE = C:\WINDOWS\HIMEM.SYS |
| STACKS = 9,256 |

The command "device=" specifies that the following file name is the name of a device driver that is to be installed. As the CONFIG.SYS file is processed, the operating system installs a device driver by loading and initializing the device driver. As part of the installation, one or more drive letters may be assigned to the device driver.

During initialization, the device driver specifies the number of drives that are controlled by it. A single device driver can control multiple drives. The operating system uses that number of drives to assign drive letters. The operating system assigns the next drive letters currently available in the computer system. For example, if the last assigned drive letter is E and the device driver being installed supports four drives, then the operating system will assign the drive letters F, G, H, and I to the device driver. The drive letter assignments are thus dependent upon the order of the device commands in the CONFIG.SYS file.

Typical computer systems utilizing compressed volumes utilize a compression system device driver to interface with a compressed volume file. For example, the line "device= COMPRESS.SYS," if placed in the CONFIG.SYS file, would cause the compression system device driver contained in the COMPRESS.SYS file to be installed. The operating system assigns a unique drive letter to the compressed volume.

The assignment of drive letters may be important because computer programs, when configured, typically expect certain devices to be assigned certain drive letters. If the device is assigned different drive letter, then the program does not work properly. The program can be reconfigured to expect a different drive letter, but reconfiguration can be time-consuming. Alternatively, a user may be required to reassign drive letters manually to correspond to the expected assignment.

Those skilled in the art will appreciate the problems that can arise when compression systems are installed as a device driver specified in the CONFIG.SYS file. For example, the presence of the extra compressed volume device may change drive letter assignments of other non-standard device drivers. Also, a user may inadvertently delete the command specifying the compression system device driver or change the parameters of the command resulting in the compressed volume being inaccessible.

Problems can also arise when a user instructs the computer system to compress data on a host volume (e.g., the C drive). Compression systems typically compress all of the data stored on the volume and store the compressed data in a compressed volume file. The operating system then assigns a drive letter (e.g., D drive) to the compressed volume. When the programs executing on the computer system attempt to reference a compressed file with the drive letter of the host volume, an invalid file reference will occur because the compressed file is accessible only through the compressed volume. For this reason, the drive letters for the compressed volume (D) and its host volume (C) are usually swapped so that the compressed volume is identified by drive letter C and the host volume is identified by drive letter D. Typically, compression systems swap drive letters by placing a command line in the CONFIG.SYS file immediately after the compression system is loaded. However, a user may inadvertently remove this swapping command.

Yet another problem with installing compression systems is the potential for invalid file references. If a compressed volume contains files required for system initialization and, for some reason, the data on the compressed volume could not be accessed, then the computer system would not be usable. To minimize the possibility that the computer system will be rendered temporarily unusable, compression systems maintain a duplicate copy of system files in the host volume and the compressed volume. The size of these duplicate files may be several megabytes.

Aside from wasting storage space by duplicating files, this method is error-prone because the duplicate files are often updated improperly; that is a user will typically update one version of a file and forget to update the duplicate copy. FIG. 2 is a block diagram of a compressed volume file 112 and its host volume 114. The host volume 114 may be any secondary storage device. The compressed volume file 112 and its host volume 114 contain duplicate copies of the IO.SYS, MSDOS.SYS, COMMAND.COM, CONFIG.SYS, AUTOEXEC.BAT files, compression software, device drivers loaded during processing of the CONFIG.SYS file, and programs executed during processing of the AUTOEXEC.BAT file.

SUMMARY OF THE INVENTION

The present invention provides a method in a computer system of integrating a compression system with an operating system. In preferred embodiments, the computer system preferably comprises a memory device and a storage devices. A user-supplied device driver is provided for non-standard devices to enable the computer system to communicate with the devices. During initialization of the computer system, the compression system is installed prior to installing any non-standard device drivers. When installing non-standard device drivers, the drive letters assigned to the previously installed compressed volumes are reassigned to ensure the non-standard devices are assigned expected drive letters. Also, when installing the compression system, a pending mount list is maintained for those compressed volumes that cannot yet be mounted. After each non-standard device driver is installed, the pending mount list is checked to determine if any compressed volumes can be mounted. When the non-standard device drivers are installed, drive letters are assigned. If the drive letter is not the expected drive letter, then a drive letter assignment scheme is provided to reassign the drive letters.

BRIEF DESCRIPTION OF THE DRAWINGS

FIGS. 11, 12, and 13 are diagrams illustrating the assignment of drive letters during the initialization process.

DETAILED DESCRIPTION OF THE INVENTION

A preferred embodiment of the present invention provides a computer method and system for integrating a compression system with an operating system. In a preferred embodiment, the operating system interacts with the compression system to install a compression system device driver prior to installing non-standard device drivers. During computer system initialization, the operating system first determines if a compression system is available to be installed. If not available, the operating system proceeds with normal initialization. However, if the compression system is available, the operating system loads a file containing the compression system into memory and invokes an initialization function of the compression system. The initialization function ensures version compatibility between the compression system and the operating system, determines which compressed volumes are to be mounted (assigned drive letters), and installs the compression system device driver. The initialization function generates a pending mount list indicating the compressed volume files to be mounted as compressed volumes and an indication of the number of drive letters that should be reserved for the compressed volumes. The operating system then invokes a drive letter assignment function to mount, if possible, the compressed volume files in the pending mount list. The operating system then installs each non-standard device driver and assigns it to the next available driver letter. When installing a non-standard device driver, the next available drive letter may be different than expected because of the drive letters reserved for the compressed volumes. Consequently, the operating system invokes the drive letter assignment function of the compression system to reassign a drive letter for a compressed volume and assigns an expected drive letter to the recently installed device driver.

Figure 1:
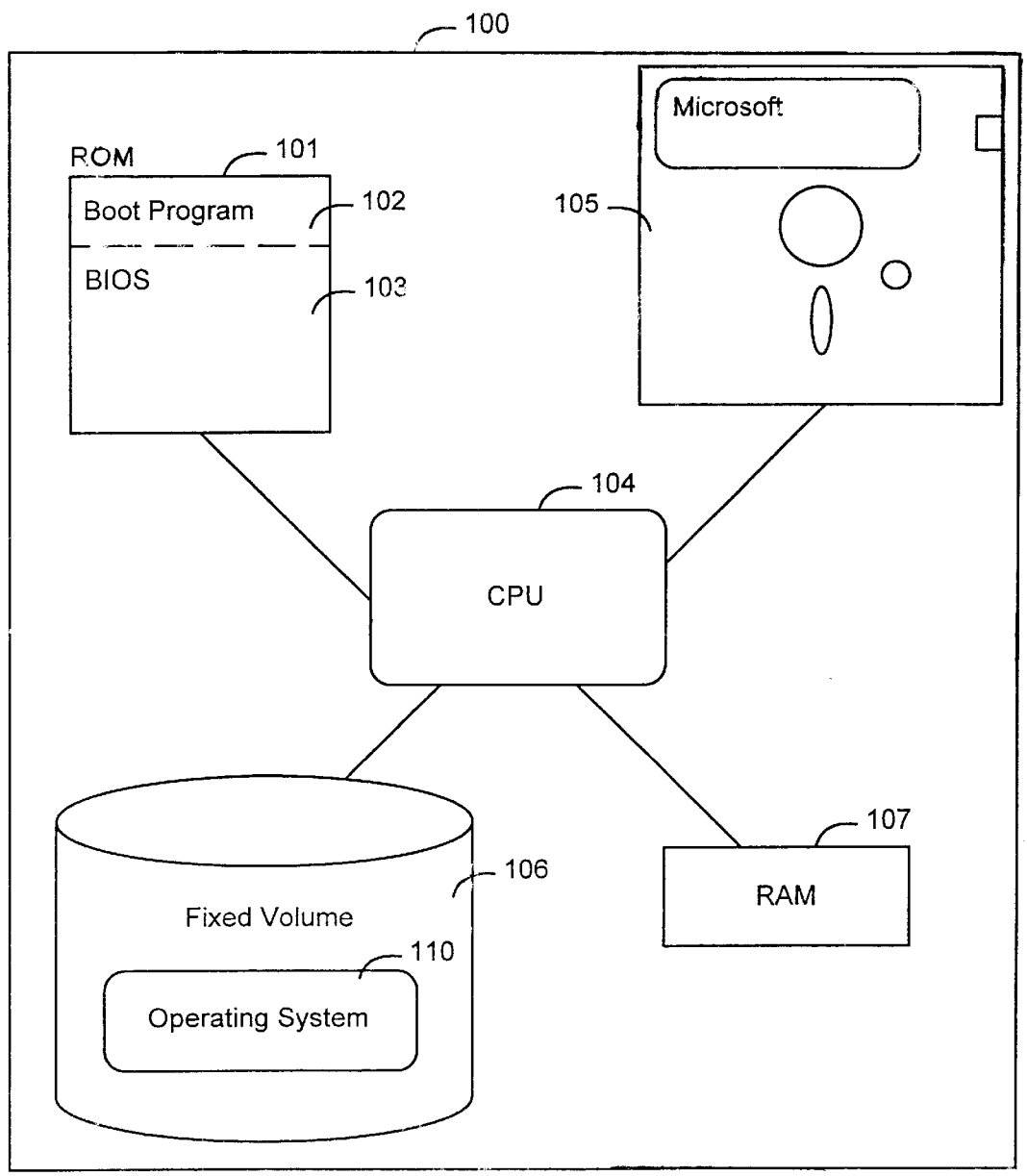
FIG. 1 is a block diagram of a conventional computer system.
Figure 2:
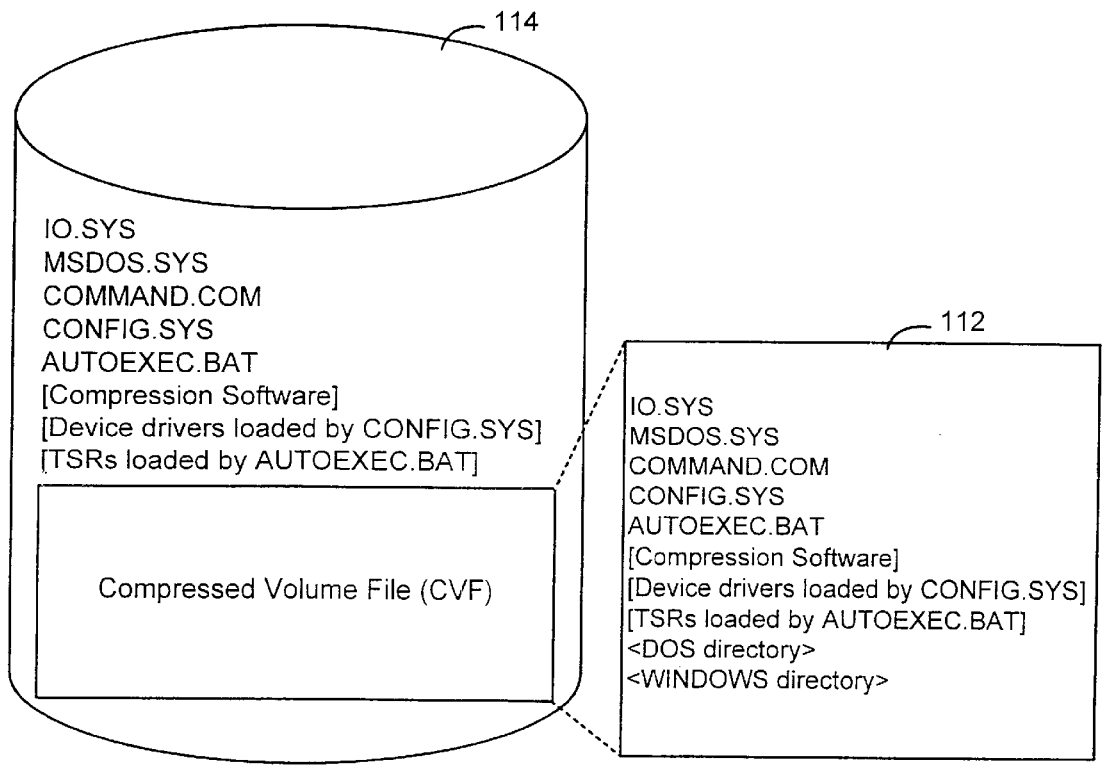
FIG. 2 is a block diagram of a prior art CVF and its host volume.
Figure 3:
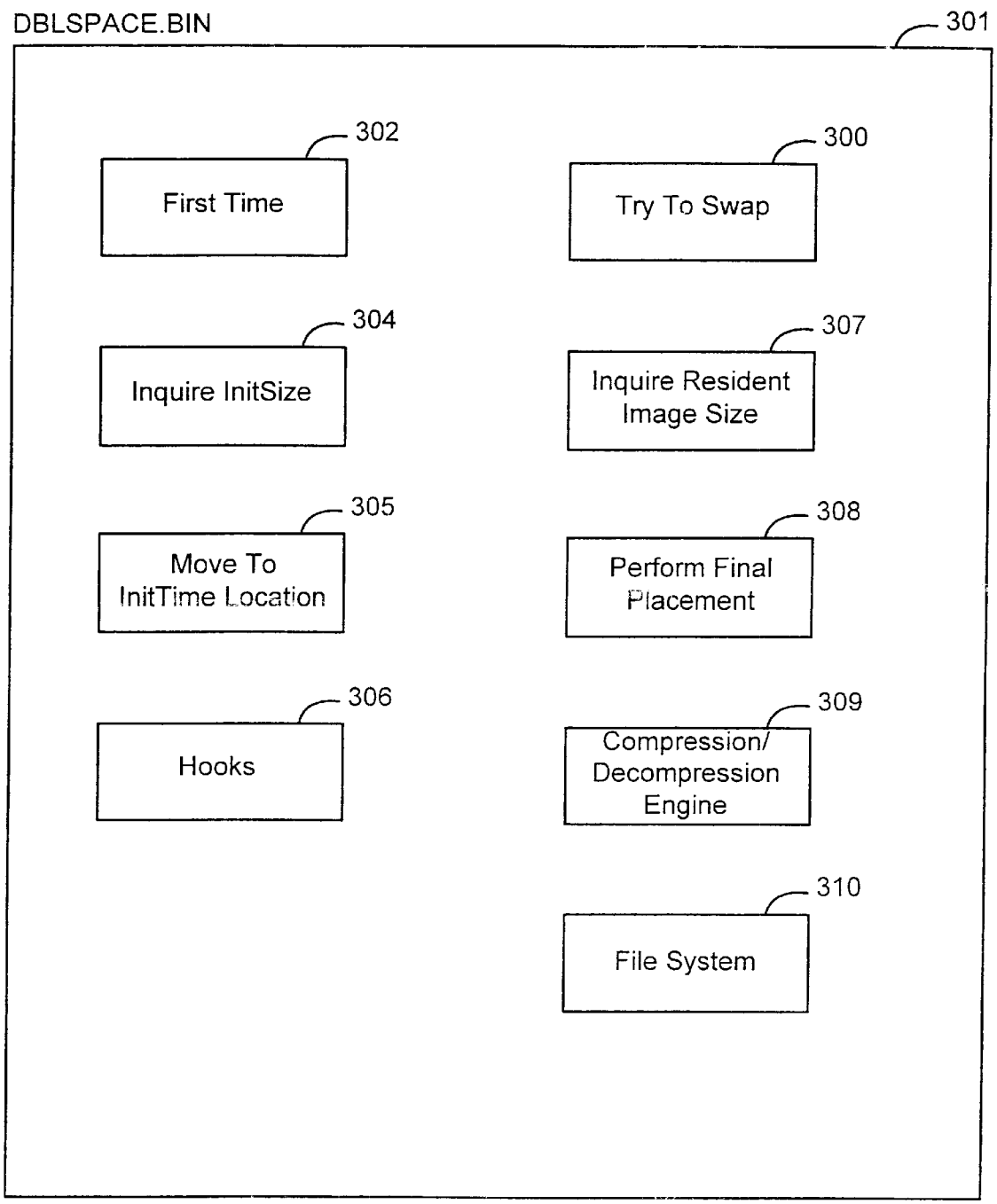
FIG. 3 is a block diagram illustrating various components of the compression system.

FIG. 3 is a block diagram illustrating various components of the compression system. The compression system is preferably stored in a file named "DBLSPACE.BIN" 301. The DBLSPACE.BIN file includes various functions 302–308 which are invoked by the operating system to effect the installing of the compression system. The function FirstTime 302 is the initialization function of the compression system. The function TryToSwap 303 is the drive letter assignment function of the compression system. The functions 304–308 are described in detail below. The compression/decompression engine 309 contains code to effect the compression algorithm. The file system 310 contains code for managing the files within a compressed volume. The compression system accesses compressed volume configuration data stored in the file named "DBLSPACE.INI." The DBLSPACE.INI file contains configuration information with the following syntax:

FirstDrive=<DL1>
LastDrive=<DL2>
ActivateDrive=<DL3, CVF>
ActivateDrive=<DL4, CVF>"FirstDrive" specifies the first available drive letter (DL1) after the standard device drivers are installed when the compression system was initially configured into the computer system. Thus, FirstDrive is specified only once and not changed. "LastDrive" specifies the last drive letter (DL2) in the range of drive letters to be reserved for compressed volumes. Thus, if FirstDrive is D and LastDrive is H, then five drive letters are reserved. Assuming that no drive letters are assigned to additional standard device drivers, then the compression system reserves drive letters FirstDrive through LastDrive. If, however, additional standard device drivers are configured into the operating system and drive letters are assigned, then the drive letters for the compression system are reserved according to the scheme described below. The reserved drive letters typically include drive letters for compressed volumes that are to be dynamically mounted after initialization is complete. "ActivateDrive" specifies that the compressed volume file identified by "DL3, CVF" is to be mounted. "DL3" specifies the drive letter to be assigned to the compressed volume. "CVF" includes a host volume drive letter and a sequence number (e.g., "C10") that specifies the compressed volume file named "DBLSPACE" with the sequence number as the file extension on the host volume (e.g., "C:\DBLSPACE.010"). If the sequence number is zero, then (as described below) after the compressed volume is mounted, the drive letters for the compressed volume and its host volume are to be swapped.

The device drivers that are assigned drive letters have a drive parameter block (DPB) created by the operating system for each drive letter assigned. The operating system maintains a linked list of these DPBs called a DPB list. The first DPB in the DPB list is assigned drive letter A, the second DPB in the DPB list is assigned drive letter B, and so on. When a newly installed device driver needs a drive letter, a DPB identifying that device driver is linked to the end of the DPB list. Consequently, device drivers are assigned the next available drive letter.

The compression system reserves drive letters by specifying to the operating system the number of drive letters to be reserved. The operating system creates a DPB for each drive letter and links the DPBs onto the end of the DPB list. When a compressed volume is later mounted, one of these DPBs is updated to point to information describing the compressed volume file.

Figure 4:
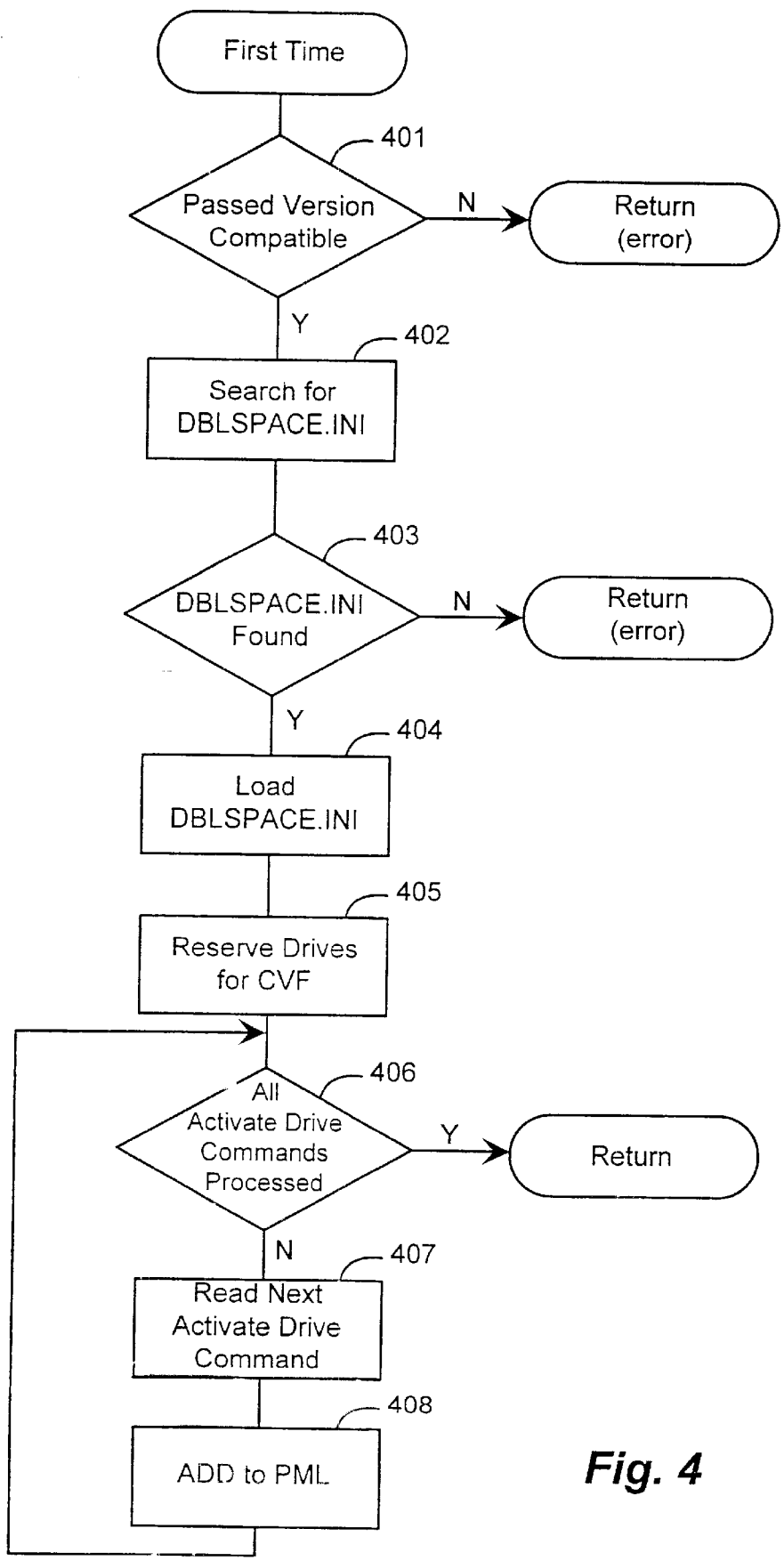
FIG. 4 is a flow diagram of the function FirstTime.

FIG. 4 is a flow diagram of the function FirstTime. The function FirstTime checks for version compatibility between the operating system and the compression system, initializes information for calls to other compression system functions, processes the DBLSPACE.INI file, and installs the compression system device driver. The function is preferably passed a pointer to a device driver initialization packet (ES:BX) and the version number (AX). (In the following, parameters are passed through registers identified using the Intel 80486 terminology. For example, AX refers to the AX register of the Intel 80486 processor.) The function returns a compatibility error (carry bit set) if the versions are not compatible and returns a general error (AX!=0) when another type of error occurs. The function generates a pending mount list of compressed volumes to be mounted and returns information in the initialization packet for the allocation of a drive parameter block (DPB) for each reserved drive letter. In step 401, if the passed operating system version number is compatible with the version number of the compression system, then the function continues at step 402, else the function returns a version compatibility error. In step 403, the function searches for the DBLSPACE.INI file. The function first searches the boot volume and may search the standard volume (described below in detail). In step 403, if the DBLSPACE.INI file is found, then the function continues at step 404, else the function returns a general error. In step 404, the function loads the DBLSPACE.INI file and returns a general error if the load for some reason fails. In step 405, the function determines the number of drive letters to reserve for the compressed volumes. The algorithm for determining the number of drive to reserve is described below in detail. In steps 406–408, the function loops processing each ActivateDrive (AD) line of the DBLSPACE.INI file. The function adds an entry to the pending mount list (PML) for each. The pending mount list contains the compressed volume drive letter, the host volume drive letter, and the sequence number from the ActivateDrive line. In step 406, if all the ActivateDrive lines have already been processed, then the function returns, else the function continues at step 407. In step 407, the function selects the next ActivateDrive line. In step 408, the function creates and stores an entry in the pending mount list for the selected ActivateDrive line and loops to step 406 to select the next ActivateDrive line. Table 2 contains sample ActivateDrive lines and the corresponding pending mount list.

TABLE 2

| DBLSPACE.INI | | |
|---|---|---|
| ActivateDrive = H,C0 | | |
| ActivateDrive = D,C1 | | |
| ActivateDrive = E,C2 | | |
| Pending Mount List | | |
| Compressed Volume Drive Letter | Host Volume Drive Letter | Sequence Number |
| H | C | 0 |
| D | C | 1 |
| E | C | 2 |

Figure 5A:
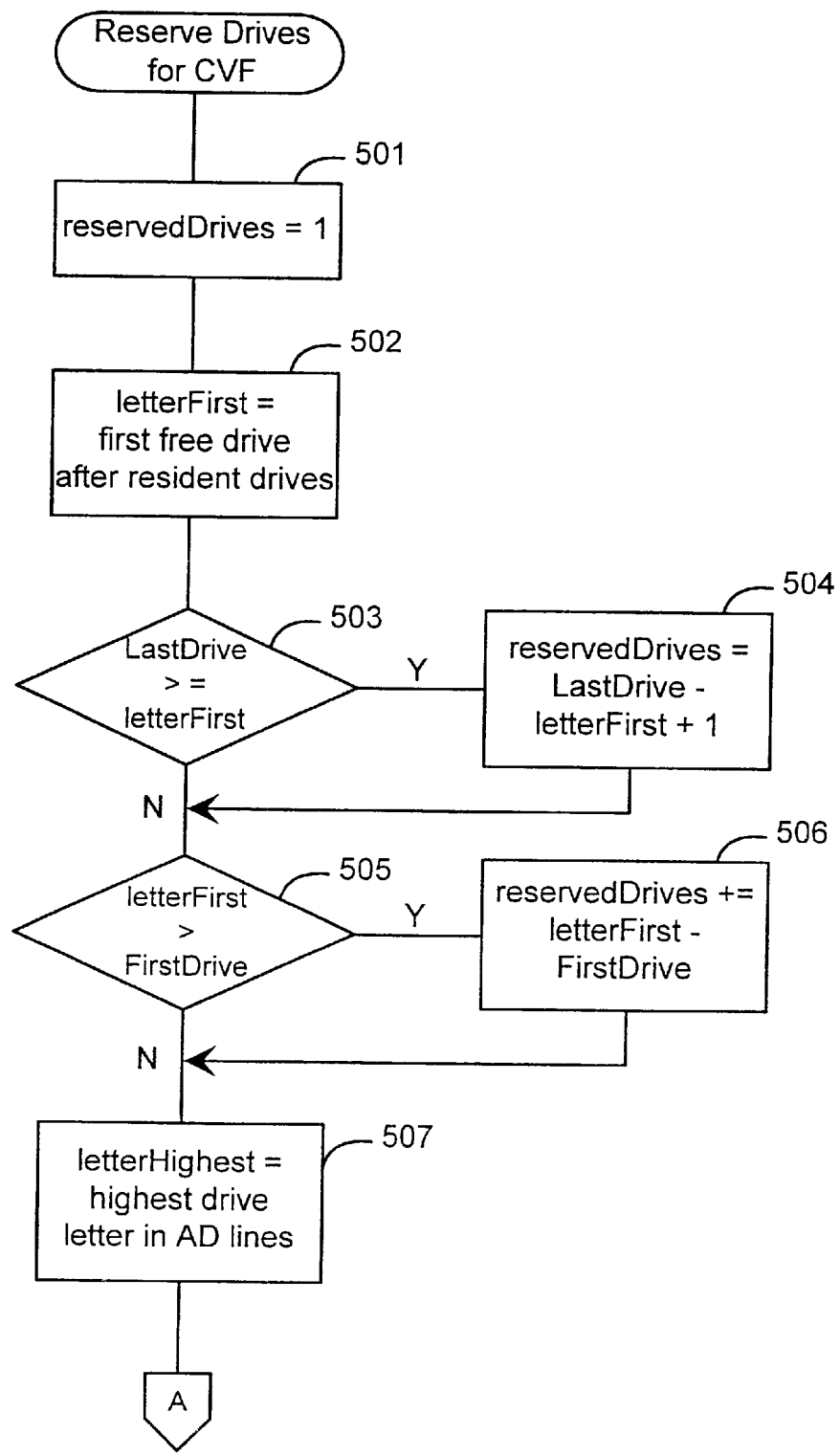
FIG. 5 is a flow diagram of the routine to determine the number of drive letters to reserve for the compressed volumes.
Figure 5B:
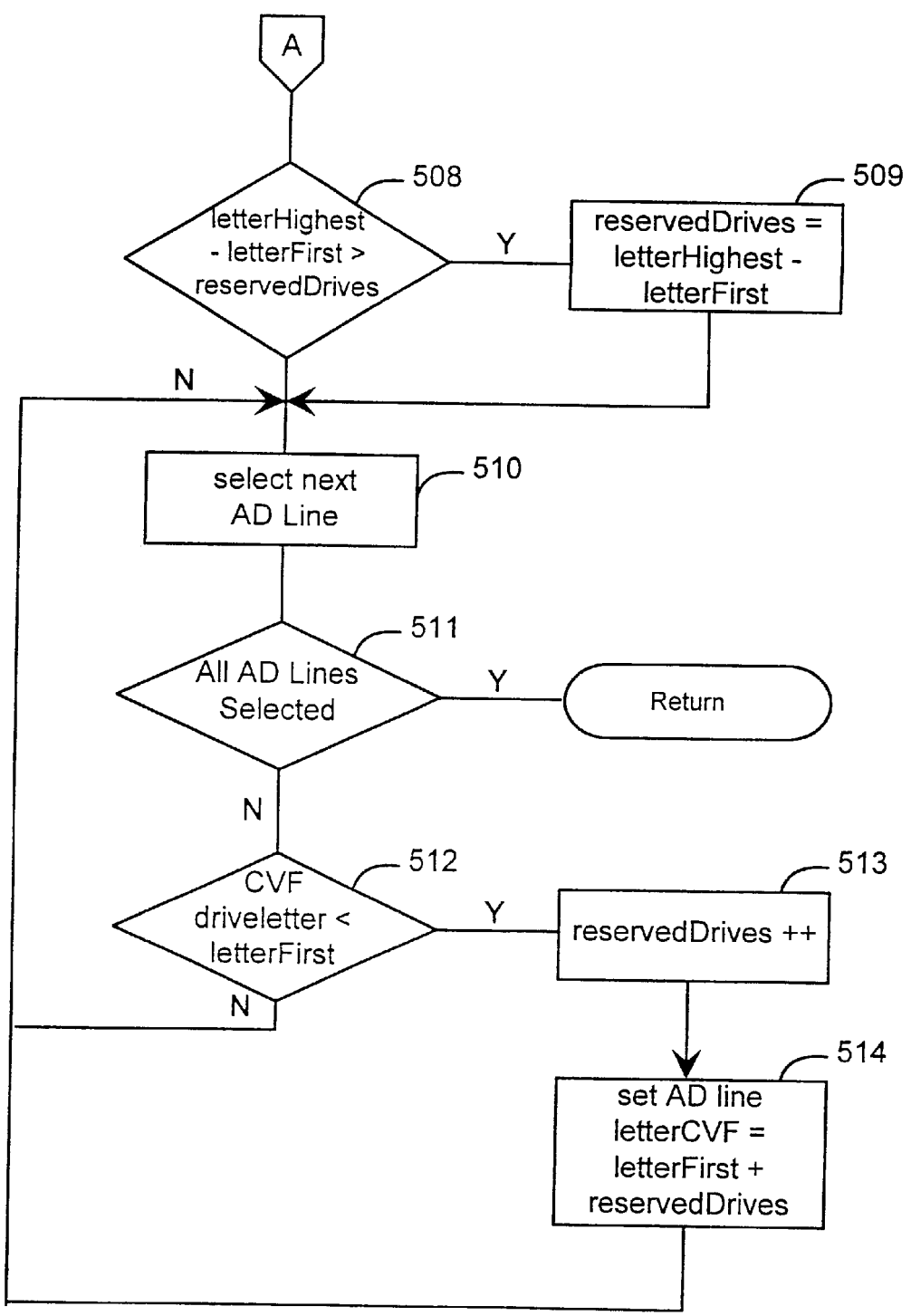

FIG. 5 is a flow diagram of the routine to determine the number of drive letters to reserve for the compressed volumes. The routine sets the variables letterFirst and reservedDrives for use in reassigning drive letters. The variable letterFirst indicates the first drive letter that is to be reserved for the compressed volumes and corresponds to the first available drive letter after installing the standard device drivers. The variable reservedDrives indicates the number of drive letters to be reserved for the compressed volumes. For example, if letterFirst is D and reservedDrives is 5, then drive letters D, E, F, G, and H are reserved for the compressed volumes. When determining the number of drive letters to reserve, the routine sets the variable letterHighest equal to the highest compressed volume drive letter assignment in an ActivateDrive line. The reserved number of drive letters is determine according to the following formula:

$$\text{maximum (LastDrive, letterHighest)} - \text{minimum (FirstDrive, letterFirst)}$$

If a compressed volume drive letter in an ActivateDrive line conflicts with a device letter assigned to a standard device driver, then the compressed volume drive letter is changed to the next higher drive letter outside the reserved range (letterFirst and reservedDrives) and letterFirst is incremented. In step 501, the routine sets the variable reservedDrives to 1, which is the minimum number of drive letters to reserve. In step 502, the routine sets the variable letterFirst to the first drive letter available after the standard device drivers are installed. In step 503, if the value of the LastDrive is greater than or equal to the variable letterFirst, then the standard device drivers have not been configured to include the drive letter LastDrive and the routine continues at step 504, else the routine continues at step 505. In step 504, the routine sets the variable reservedDrives equal to the number of drives in the range of drives represented by letterFirst through LastDrive. In step 505, if the variable letterFirst is greater than the value of the FirstDrive line, then standard device drivers have been added to the operating system since the initial configuring of the compression system and the routine continues at step 506, else the routine continues at step 507. In step 506, the routine increases the variable reservedDrives to reflect the difference between letterFirst and FirstDrive. In step 507, the routine sets the variable letterHighest equal to the highest compressed volume drive letter in the ActivateDrive lines. In step 508, if the number of drive letters in the range letterFirst through letterHighest is greater than the variable reservedDrives, then the routine continues at step 509, else the routine continues at step 510. In step 509, the routine sets the number of reserved drive letters to the number of drive letters in the range letterHighest to letterFirst.

In steps 510 through 514, the routine loops adjusting compressed volume drive letters of ActivateDrive lines that are less than the first available drive letter (letterFirst). This may occur as a result of standard device drivers being added since initial configuration of the compression system. In step 510, the routine selects the next ActivateDrive line starting with the first. In step 511, if all the ActivateDrive lines have already been selected, then the routine returns, else the routine continues at step 512. In step 512, if the compressed volume drive letter of the selected ActivateDrive line is less that the first available drive letter, then the routine continues at step 513, else the routine loops to 510 to select the next ActivateDrive line. In step 513, the routine increments the number of reserved drives. In step 514, the routine sets the compressed volume drive letter of the selected ActivateDrive line to the last reserved drive letter and loops to step 510 to select the next ActivateDrive line. In an alternate embodiment, a compressed volume assigned a drive letter that is lower than letterFirst is reassigned to the first drive letter reserved for the compressed volumes.

Figure 6:
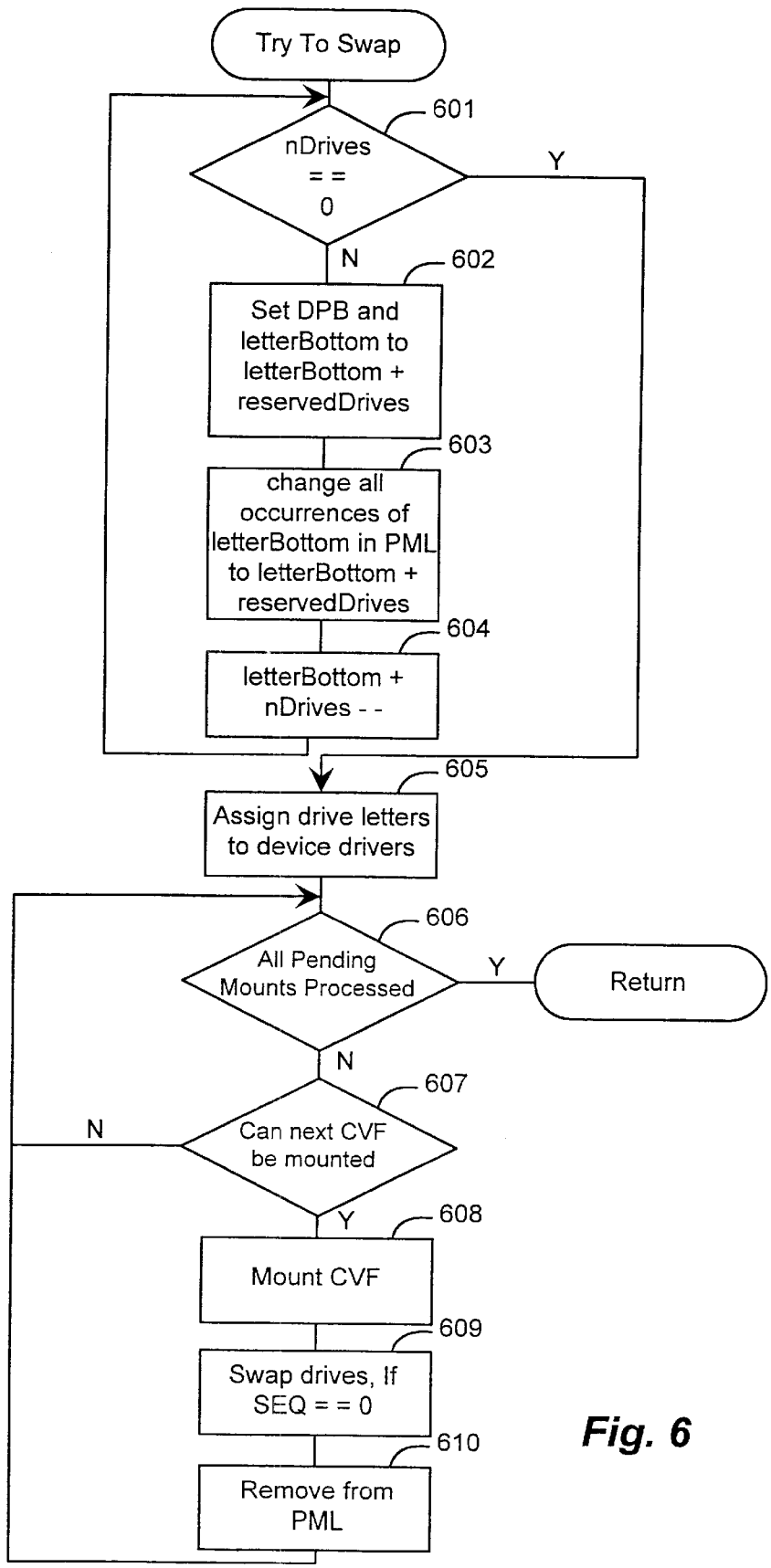
FIG. 6 is a flow diagram of the function TryToSwap.

FIG. 6 is a flow diagram of the function TryToSwap. The function TryToSwap is passed the number of drive letters that needs to be assigned to a newly installed device driver, the first drive letter (letterBottom) reserved for the compressed volumes, and the number of drive letters reserved. This function resolves conflicts between drive letters reserved for compressed volumes and the drive letters expected by device drivers. The function reassigns volumes in the range reserved for compressed volumes to available drive letters so that the operating system can assign expected drive letters to newly installed device drivers. DPBs for the newly assigned drive letters are linked at the end of the DPB list when this function is invoked. After reassigning drive letters, this function mounts drives from the pending mount list that can now be mounted because of the reassignment. If the passed number of drive letters is zero, then this function mounts drives from the pending mount list without reassigning drive letters. In steps 601 through 604, the function loops reassigning compressed volume files to new drive letters. In step 601, if the number of drive letters needed is equal to 0 (nDrives=0), then sufficient compressed volumes have been reassigned or none need be reassigned and the function continues at step 605, else the function continues at step 602. In step 602, the function reassigns the compressed volume currently assigned to the drive letter indicated by letterBottom to the first available drive letter, that is, the drive letter indicated by letterBottom plus the number of reserved drives (reservedDrives). This reassignment includes moving the DPB for the compressed volume to the end of the DPB list. In step 603, the function changes all references in the pending mount list for the drive letter indicated by letterBottom to the new drive letter to reflect the new drive letter assignment of the compressed volume. In step 604, the function increments the variable letterBottom to indicate the lowest drive letter reserved for a compressed volume, decrements the number of drive letters needed, and loops to step 601.

In step 605, the function assigns the drive letters previously assigned to the compressed volumes to the newly installed device drivers. This includes moving the DPBs for the newly installed device drives (that were at the end of the DPB list when the function was invoked) to before the DPBs reserved for the compressed volumes (letterFirst). In steps 606 through 610, the function loops mounting those compressed volumes in the pending mount list that can now be mounted. There are several reasons why an attempted mount might not be successful. If the host volume for a compressed volume is not a standard device, then the compressed volume cannot be mounted until the CONFIG.SYS file is processed. Also, some standard device drivers may support reading from the device, but not writing. However, a non-standard device driver may be installed when processing the CONFIG.SYS file. In step 606, if all the entries in the pending mount list have been processed, then the function returns, else the function continues at step 607. In step 607, if the compressed volume for the next entry in the pending mount list can be mounted, then the function continues at step 608, else the function loops to step 606. A compressed volume might be mounted if the device driver for its host volume was installed since last invocations of this function. In step 608, the function mounts the compressed volume indicated by the next entry in the pending mount list. The mounting includes setting a DPB reserved for a compressed volume to point to information describing the compressed volume. In step 609, the function swaps the drive letters of the mounted compressed volume and its host volume when the sequence number is zero. In step 610, the function removes the entry from the pending mount list and loops to step 606 to process the next entry.

The functions InquireInitSize and MoveToInitLocation are invoked to move the compression system code needed after the initialization function (FirstTime) executes. The function InquireInitSize specifies the amount of memory that is needed for the compression system code after the initialization function executes. The number of paragraphs of memory needed for the code is returned (AX). The function MoveToInitTimeLocation moves the compression system code to the passed address. The function MoveToInitTimeLocation is passed the segment base address (ES) of where to move the code. The function returns the ending address (AX) of the driver's low stub so that the portion of compression system code that has been moved can be freed.

The functions InquireResidentImageSize and PerformFinalPlacement are invoked to move the resident portion of the compression system that is needed after processing CONFIG.SYS file. These functions are invoked through a multiplexing interrupt for invoking functions of a variety of terminate-and-stay-resident programs. These functions are preferably invoked by the DBLSPACE.SYS file as specified by the CONFIG.SYS file (as described below in detail). In MS-DOS, the multiplexing interrupt is the Int2f interrupt and the function number for these functions is 4A11h. The function InquireResidentImageSize is specified by BX=−1, and the function PerformFinalPlacement is specified by BX=−2. The function InquireResidentImageSize specifies the number of paragraphs that is needed by the resident portion of the compression system. The function InquireResidentImageSize returns the number of paragraphs (AX) of memory needed. The function PerformFinalPlacement moves the resident portion of the compression system. The function PerformFinalPlacement is passed the segment base address (ES) of where to locate the resident portion.

The function HooksInt installs hooks on interrupt vectors. In a preferred embodiment, the compression system hooks interrupts Int21, Int26, and Int2f. This function is invoked after the operating system has set the operating system interrupt vectors.

Figure 7:
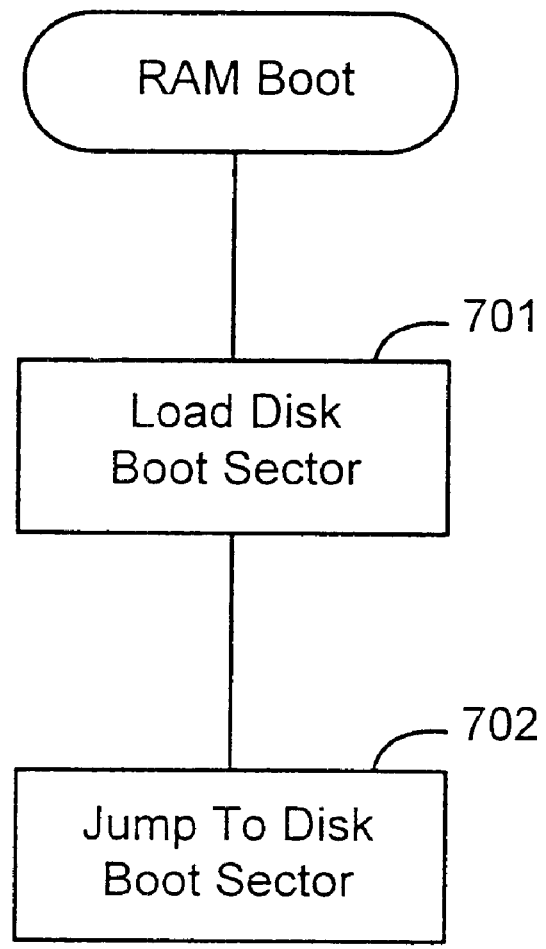
FIG. 7 is a flow diagram of the ROMBoot routine.

FIGS. 7 through 10 are flow diagrams illustrating a preferred initialization portion of an operating system that is adapted to install a compression system in accordance with the present invention. When the computer system is first powered up or otherwise booted, control is transferred to a ROMBoot routine. FIG. 7 is a flow diagram of the ROMBoot routine. In step 701, the routine determines which volume to boot from and loads the disk boot sector from that boot volume. The disk boot sector contains code to effect booting from disk. In step 702, the routine jumps to the loaded code (the DiskBootSector routine).

Figure 8:
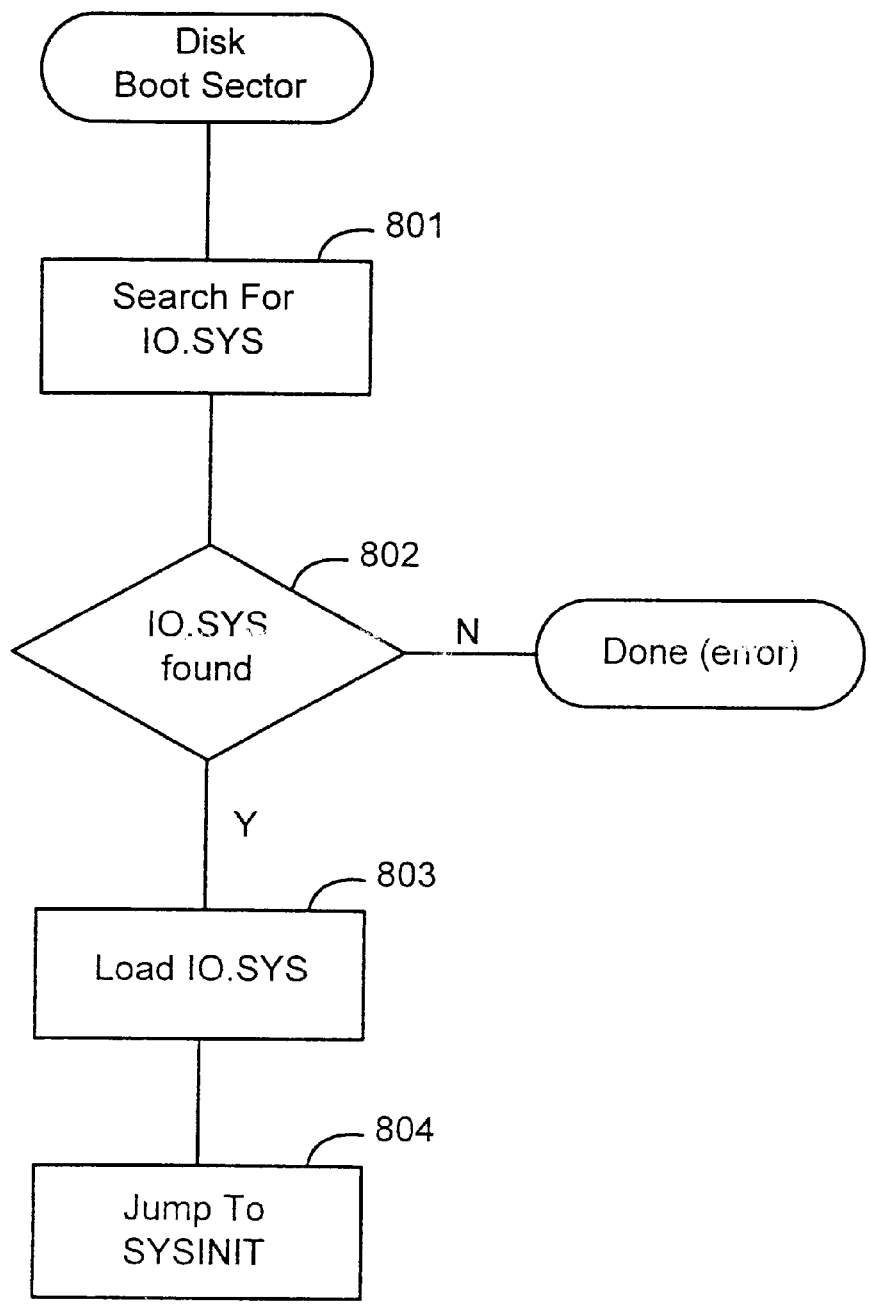
FIG. 8 is a flow diagram of the DiskBootSector routine.

FIG. 8 is a flow diagram of the DiskBootSector routine. The DiskBootSector routine loads the filed named "IO.SYS" and jumps to the SYSINIT routine of that file. The IO.SYS file contains code to continue with the system initialization. In step 801, the routine searches the boot volume for the IO.SYS file. In step 802, if the IO.SYS file is found, then the routine continues at step 803, else the routine terminates the boot process with an error. In step 803, the routine loads the IO.SYS file. In step 804, the routine jumps to the SYSINIT (system initialization) routine of the loaded IO.SYS file.

Figure 9A:
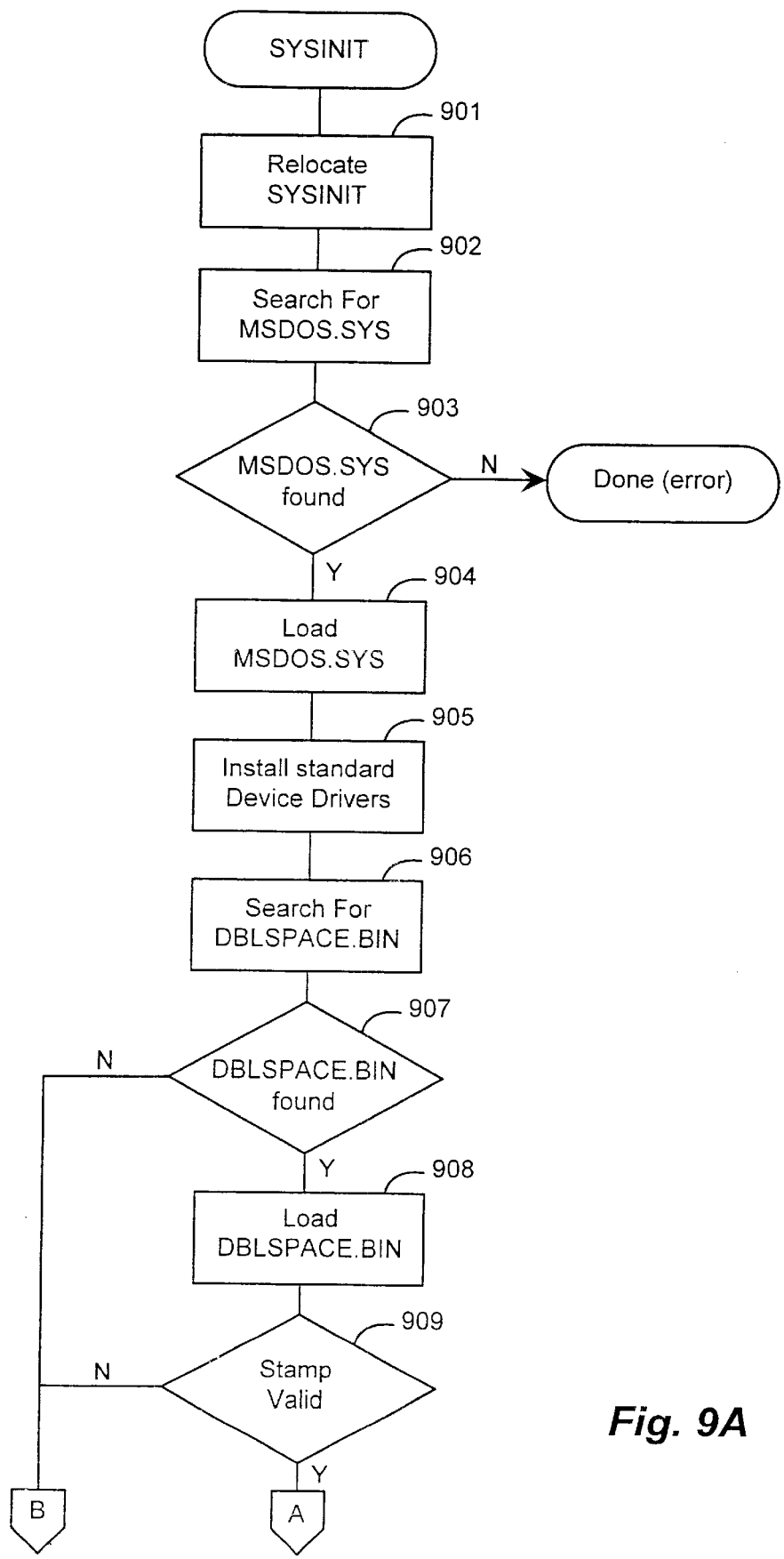
FIGS. 9A and 9B comprise a flow diagram of the SYSINIT routine.
Figure 9B:
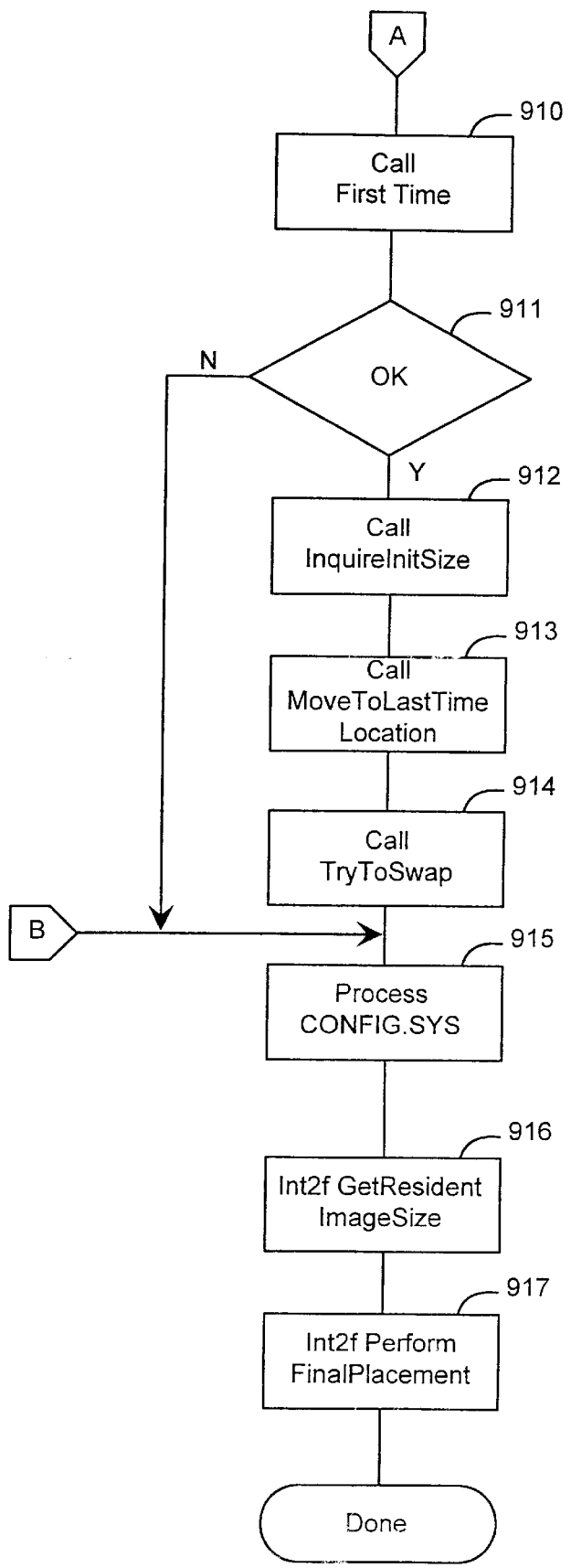

FIGS. 9A and 9B comprise a flow diagram of the SYSINIT routine. The SYSINIT routine installs the standard device drivers, installs the compression system device driver, and installs the non-standard device drivers. The routine invokes the functions of the compression system to coordinate the installing of the compression system device driver and to coordinate the assignment of drive letters. In step 901, the routine relocates the SYSINIT code to high memory. The SYSINIT code was initially loaded into low memory. The device drivers loaded by the routine will also be loaded into low memory. Since the SYSINIT code is not needed after system initialization, it is moved so that the device drivers can be loaded in to the lowest memory possible. If the SYSINIT code was not moved, then a gap would result in low memory. In step 902, the routine searches for the file named "MSDOS.SYS". The MS-DOS.SYS file contains the kernel of the operating system. In step 903, if the MSDOS.SYS file is found, then the routine continues at step 904, else the initialization terminates with an error. In step 904, the routine loads the MSDOS.SYS file. In step 905, the routine installs the standard device drivers by loading the device drivers and assigning drive letters. In step 906, the routine searches for the file named "DBLSPACE.BIN". The DBLSPACE.BIN file preferably contains code to initialize the compression system. In step 907, if the DBLSPACE.BIN file is found, then the routine continues at step 908, else the routine continues at step 915. In step 908, the routine loads the DBLSPACE.BIN file. In step 909, if the stamp field of the DBLSPACE.BIN file is valid, then the routine continues at step 910, else the routine continues at step 915. The DBLSPACE.BIN file contains a predefined value at a predefined location (the stamp field). The presence of that predefined value is a double check to ensure that the DBLSPACE.BIN file is a compression system and not a file that a user inadvertently named DBLSPACE.BIN. In a preferred embodiment, the predefined value is the ASCII characters comma and period (",.") and the predefined location is 12h of the file. In step 910, the routine invokes the function FirstTime of the DBLSPACE.BIN file to install the compression system device driver, reserve drive letters, and establish a pending mount list. In step 911, if the function FirstTime executed without an error, then the routine continues at step 912, else the routine continues at step 915. In steps 912 and 913, the routine directs the compression system to locate its code that is needed after execution of the initialization function (FirstTime) so that non-standard device drivers can be loaded in low memory. In step 912, the routine invokes the function InquireInitSize of the compression system to determine the amount of memory the compression system needs. In step 913, the routine determines where the compression system code is to be relocated and invokes the function MoveToInitTimeLocation of the compression system to move the code. In step 914, the routine invokes the function TryToSwap of the compression system passing a drive letter count of zero (nDrives=0). This allows the compression system the opportunity to mount the compressed volumes in the pending mount list that can be mounted based on the previously installed device drivers for the standard devices. In step 915, the routine invokes the function ProcessConfig to process the CONFIG.SYS file. The function ProcessConfig installs the non-standard device drivers and directs mounting of compressed volumes that have not yet been mounted. The resident portion of compression system may have been moved to its final location by a memory manager when processing the CONFIG.SYS file that contains a reference to the DBLSPACE.SYS file (described below in detail). In steps 916 and 917, the routine moves the compression system to its final resident location if not already moved. In step 916, the routine invokes the function GetResidentImageSize of the compression system to determine the amount of memory needed by the resident portion of the compression system. In step 917, the routine invokes the function PerformFinalPlacement of the compression system to move the resident portion of the compression system to its final resident location.

Figure 10:
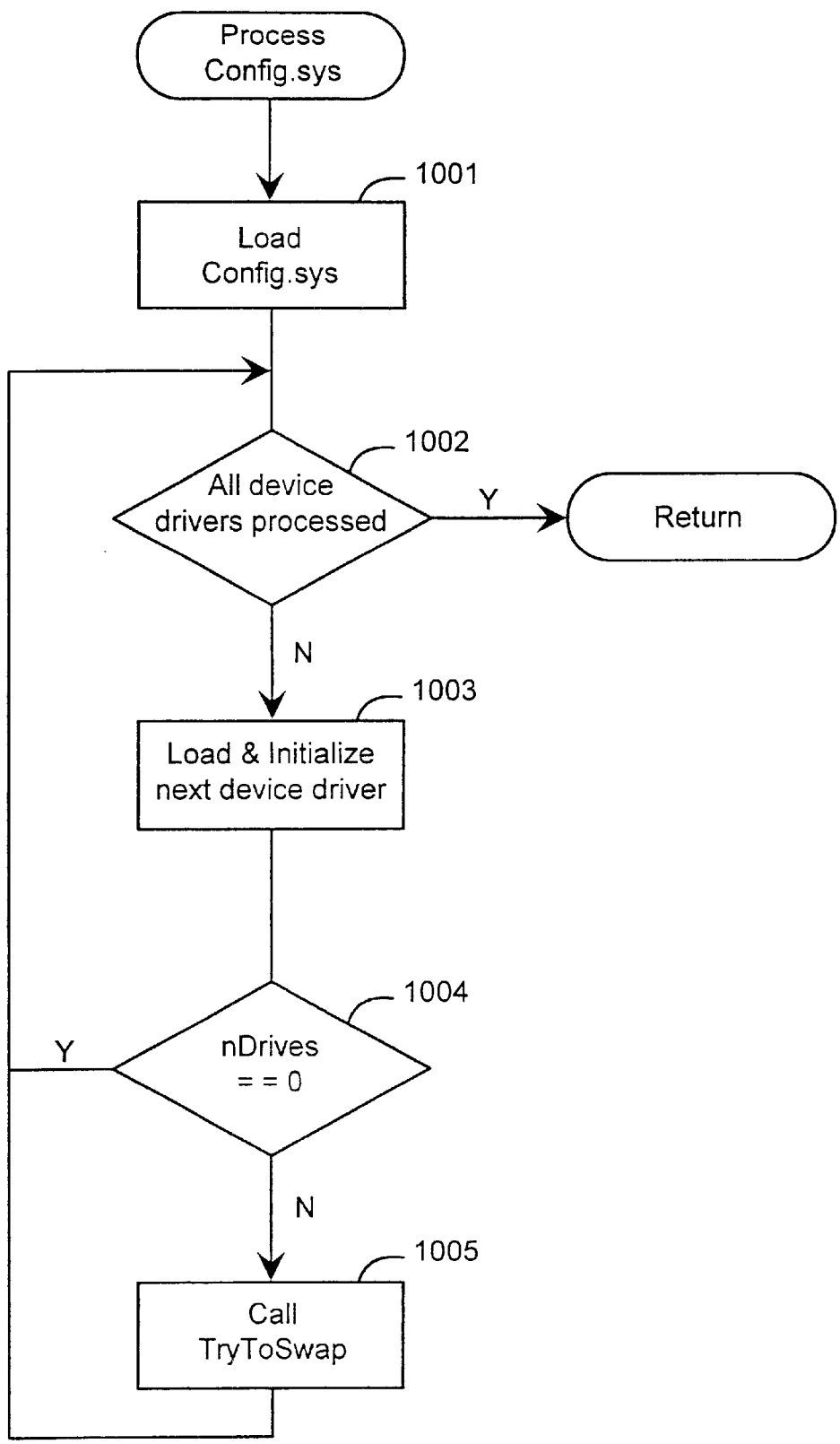
FIG. 10 is a flow diagram of the function ProcessConfig.

FIG. 10 is a flow diagram of the function ProcessConfig. The function ProcessConfig installs the non-standard device drivers and directs mounting of compressed volumes. In step 1001, the routine searches for and, if found, loads the CONFIG.SYS file. In step 1002, if all the device drivers specified in the CONFIG.SYS file have been processed, then the function returns, else the function continues at step 1003. In step 1003, the function installs the next device driver specified in the CONFIG.SYS file. The installed device driver returns an indication of the number of drive letters it requires (nDrives) and is temporarily assigned a drive letter greater than the drive letters reserved for the compression system. This assignment is accomplished by the standard operating system technique of adding DPBs onto the end of the DPB list. In step 1004, if the number of drive letters required is zero, then the function loops to step 1002 to process the next device driver, else the function continues at step 1005. In step 1005, the function invokes the function TryToSwap of the compression system to swap the drive letters for the newly installed device driver and for any volumes assigned drive letters in the range reserved for compressed volumes and the function loops to step 1002 to process the next device driver.

TABLE 3

DBLSPACE.INI

FIRSTDRIVE = D
LASTDRIVE = H
ACTIVATEDRIVE = H,C0
ACTIVATEDRIVE = D,C1
ACTIVATEDRIVE = E,C2
CONFIG.SYS

DEVICE = C:\RD1.SYS
SHELL = C:\DOS\COMMAND.COM C:\DOS\/e:1024 /p
DEVICE = C:\DOS\HIMEM.SYS
STACKS = 9,256
DOS = HIGH, UMB
FILES = 50
DEVICEHIGH = C:\DOS\DBLSPACE.SYS /MOVE

Table 3 contains a sample DBLSPACE.INI file and CONFIG.SYS file. The ActivateDrive lines indicate that three compressed volumes are to be mounted. The compressed volume file (CVF0) named C:\DBLSPACE.000 is to be mounted as drive C: and its host volume is to be swapped to drive H as indicated by the line "ACTIVATEDRIVE=H, C0". The compressed volume file (CVF1) named C:\DBLSPACE.001 is to be mounted as drive D as indicated by line "ACTIVATEDRIVE=D,C1". The compressed volume file (CVF2) named "C:\DBLSPACE.002" is to be mounted as drive E as indicated by the line "ACTIVATEDRIVE=E,C2". The CONFIG.SYS file indicates that a non-standard device driver in the RD1.SYS file is to be installed.

FIG. 11 is a diagram illustrating the assignment of drive letters during the initialization process. The routine SYSINIT assigns the device drivers for two floppy disk drives (FD) and for one hard disk drive (HD) to drive letters A, B, and C, respectively.

The routine SYSINIT then invokes function FirstTime. The function FirstTime determines the first drive letter (letterFirst) that is available after loading the standard device drivers and the number of drive letters (reservedDrives) to be reserved for the compressed volumes. The function FirstTime also adds an entry to the pending mount list (PML) for each compression volume to be mounted. As indicated by line 1101, drive letters A and B are assigned to floppy drives (FD), drive letter C is assigned to a hard drive (HD), and drive letters D through H are reserved for the compressed volumes (CR). The pending mount list also contains an entry for CVF0, CVF1, and CVF2.

The routine SYSINIT then invokes the function TryToSwap passing an indication that no drives letters need be swapped and the reserved drive letters specified by letterBottom and reservedDrives. The function TryToSwap tries to mount the compressed volumes on the pending mount list. As indicated by line 1102, the function removes the entry for CVF0 from the pending mount list. The function mounts CVF0 by updating the DPB for drive letter H to point to CVF0. The function then swaps the DPBs for drive letter C and H. A sequence number of zero indicates that the drive letters for the host and compressed volumes are to be swapped. As indicated by line 1103, the function removes the entry for CVF1 from the pending mount list and mounts CVF1 by updating the DPB for drive letter D to point to CVF1. As indicated by line 1104, the function removes the entry for CVF2 from the pending mount list and mounts CVF2 by updating the DPB for the drive letter E to point to CVF2.

The routine SYSINIT then processes the CONFIG.SYS file. The routine installs the device driver in the RD1. SYS file and temporarily assigns RD1 to drive letter I. This is accomplished by adding the DPB for RD1 onto the end of the DPB list. The routine SYSINIT invokes the function TryToSwap passing a parameter indicating that one drive letter is to be swapped. The function swaps the DPBs for CVF0 and RD1 and updates letterBottom.

FIG. 12 is a diagram illustrating the assignment of drive letter for the sample of Table 3 when an additional standard device driver (RD0) is installed. As indicated by line 1200, standard device drivers are assigned drive letters A through D. As indicated by line 1201, five drive letters are reserved for the compressed volumes and the pending mount list contains entries CVF0, CVF1, and CVF2. The compressed volume drive letter for CVF1 in the pending mount list has been changed to I because a conflict occurred with the additional device driver RD0. As indicated in line 1206, when the device driver RD1 was installed, it conflicted with the drive letter for CVF2 so their drive letters were swapped.

TABLE 4

DBLSPACE.INI

FIRSTDRIVE = D
LASTDRIVE = H
ACTIVATEDRIVE = H,C0
ACTIVATEDRIVE = F,E1
ACTIVATEDRIVE = G,C2
CONFIG.SYS

DEVICE = C:\RD1.SYS
DEVICE = C:\RD2.SYS
SHELL = C:\DOS\COMMAND.COM C:\DOS\/e:1024 /p
DEVICE = C:\DOS\HIMEM.SYS
STACKS = 9,256
DOS = HIGH, UMB
FILES = 50
DEVICEHIGH = C:\DOS\DBLSPACE.SYS /MOVE

Table 4 contains a sample DBLSPACE.INI file and CONFIG.SYS file. The ActivateDrive lines indicate that three compressed volume files are to be mounted. The compressed volume file (CVF0) named C:\DBLSPACE.000 is to be mounted as drive C and its host volume is to be swapped to drive H as indicated by the line "ACTIVATEDRIVE=H, C0". The compressed volume file (CVF1) named E:\DBLSPACE.001 is to be mounted as drive F as indicated by line "ACTIVATEDRIVE=F,E1". The compressed volume file (CVF2) named "C:\DBLSPACE.002" is to be mounted as drive G as indicated by the line "ACTIVATEDRIVE=G,C2". In this example, it is assumed that the operating system installs four standard device drivers.

FIG. 13 is a diagram illustrating the assignment of drives during the initialization process. The routine SYSINIT assigns the device drivers for two floppy disk drives (FD), one hard disk drive (HD), and one ROM drive (RD0) to drive letters A, B, C, and D, respectively.

The routine SYSINIT then invokes function FirstTime. The function FirstTime determines the first drive letter (letterFirst) for the compressed volume files and the number of drive letters (reservedDrives) to be reserved for the compressed volume. The function FirstTime also adds an entry to the pending mount list for each compressed volume.

The routine SYSINIT then invokes the function TryToSwap passing an indication that no drives letters need be swapped. The function TryToSwap mounts the compressed volumes on the pending mount list. As indicated by line 1302, the function removes the entry for CVF0 from the pending mount list. The function sets the DPB for driver letter H to point to CVF0 and then swaps the drive letters with the DPB for drive letter C. As indicated by line 1303, the function cannot yet mount CVF1 because no device driver has been mounted for drive letter E. The function removes the entry for CVF2 from the pending mount list. The function sets the DPB for drive letter G to point to CVF2.

The routine SYSINIT then processes the CONFIG.SYS file. As indicated by line 1304, the routine installs the device driver in the RD1.SYS file and temporarily assigns RD1 to drive letter J. The routine SYSINIT invokes the function TryToSwap passing a parameter indicating that one drive letter is to be swapped. The function TryToSwap assigns RD1 to drive letter E (letterFirst) by swapping the DPBs as indicated by line 1305. The function then removes the entry for CVF1 from the pending mount list. The function sets the DPB for drive letter F to point to CVFL1.

The routine then installs the device driver in the RD2.SYS file and temporarily assigns RD2 to drive letter K as indicated by line 1307. The routine SYSINIT invokes the function TryToSwap passing a parameter indicating that one drive letter is to be swapped. The function assigns RD2 to drive letter F (letterFirst) by swapping the DPBs as indicated by line 1308.

Figure 14:
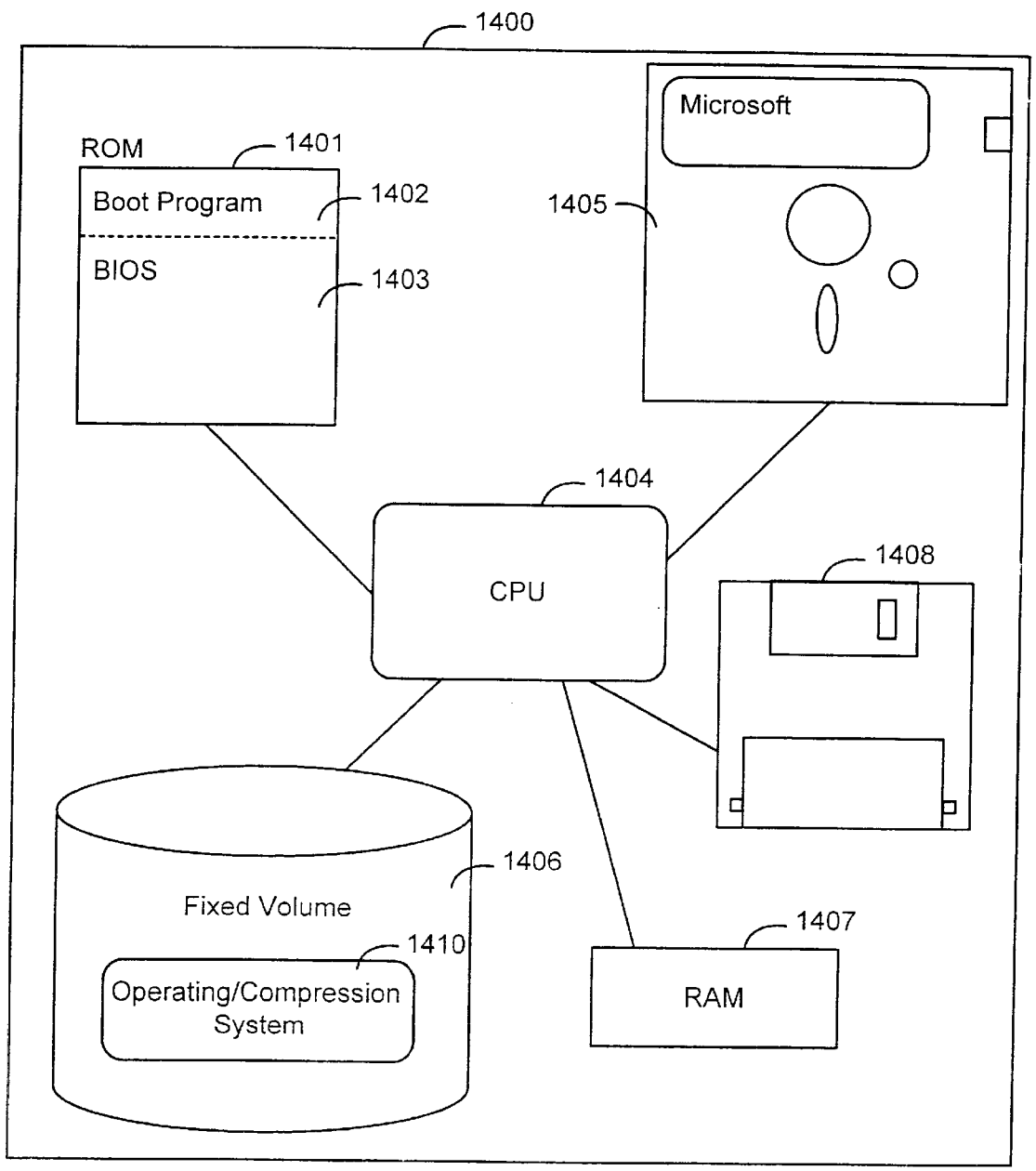
FIG. 14 is a block diagram of a computer system implementing a preferred embodiment of the present invention.

FIG. 14 is a block diagram of a computer system implementing a preferred embodiment of the present invention. A preferred operating system and compression system are stored on fixed volume 1406.

Figure 15:
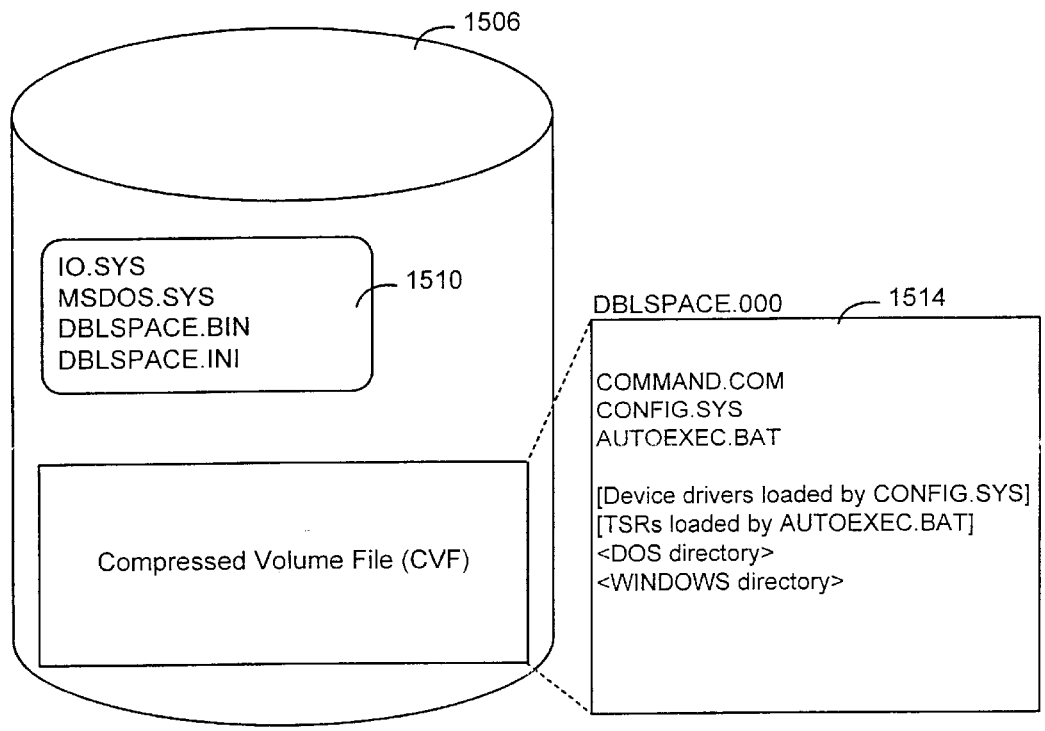
FIG. 15 is a block diagram of a preferred compressed volume file stored on a fixed volume.

FIG. 15 is a block diagram of a preferred compressed volume file 1501 stored on a fixed volume. The system files that make up the core of the operating/compression system 1410 (IO.SYS, MSDOS.SYS, DBLSPACE.BIN, and DBLSPACE.INI) are stored on the fixed volume 1406. While the fixed volume drive 1406 is shown as the host volume for the compressed volume file 1501, the host volume may been one of the removable volume drives 1405, 1408. The compressed volume file 1501 contains the files COMMAND.COM, CONFIG.SYS, and AUTOEXEC.BAT. Additionally, the compressed volume file 1501 contains device drivers referenced in the CONFIG.SYS file and programs loaded during processing of the AUTOEXEC.BAT file. A preferred embodiment of the present invention alleviates the need for storing duplicate system files in a compressed volume file and its host volume.

In a preferred embodiment, the computer system can be initialized and the compression system installed from a removable volume. Moreover, this can be accomplished when the removable volume contains no references to what compressed volumes are stored in the computer system (i.e., no DBLSPACE.INI file). A compression system can be installed when the computer system is initialized from a removable volume (e.g., a floppy disk drive assigned to drive letter A). When IO.SYS, MSDOS.SYS, and DBLSPACE.BIN files are stored on the removable volume, but the DBLSPACE.INI file is stored on a fixed volume (e.g., a hard disk drive assigned to drive letter C), the compressed volumes specified in the DBLSPACE.INI file on the fixed volume are still mounted.

The function FirstTime of the compression system locates a DBLSPACE.INI file. If the boot volume contains a DBLSPACE.INI file, then that file is used by the compression system. If the boot volume is a fixed drive, such as the standard drive C of MS-DOS, and the boot volume does not contain a DBLSPACE.INI file, then the compression system is not installed. If the boot volume is a removable drive and the boot volume does not contain a DBLSPACE.INI file, then the function FirstTime searches a fixed volume, such as the standard drive C of MS-DOS. If DBLSPACE.INI file is still not found, then the compression system is not installed.

Figure 18:
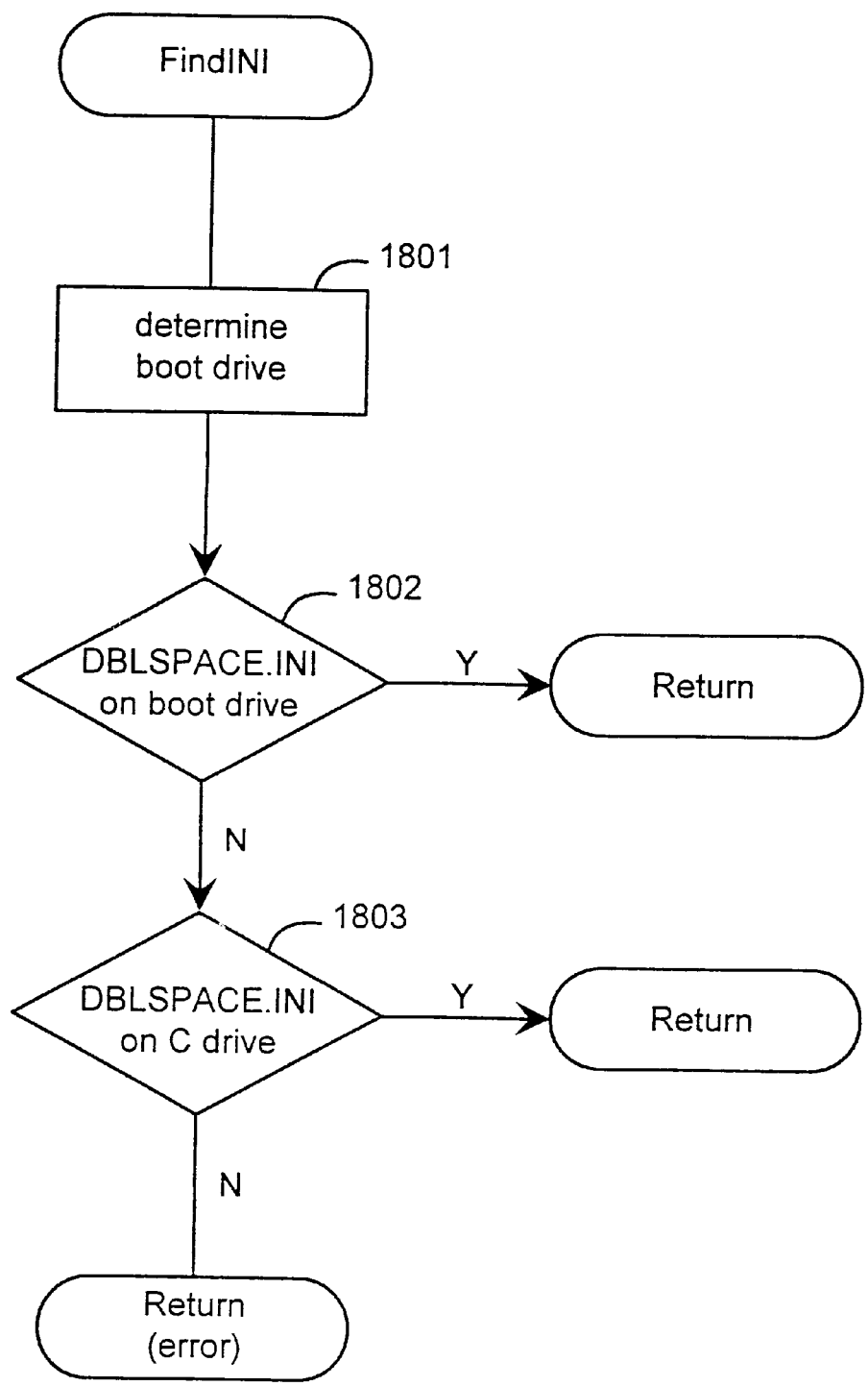
FIG. 18 is a flow diagram of the FindINI routine.

FIG. 18 is a flow diagram of a routine for determining the location of the DBLSPACE.INI file. In step 1801, the routine determines the boot drive. In step 1802, if a DBLSPACE.INI file in on the boot drive, then that file is used for compression system initialization and the routine returns, else the routine continues at step 1803. In step 1803, if a DBLSPACE.INI file is on the standard drive, then that file is used for compression system initialization and the routine returns, else the routine returns an error.

Figure 16:
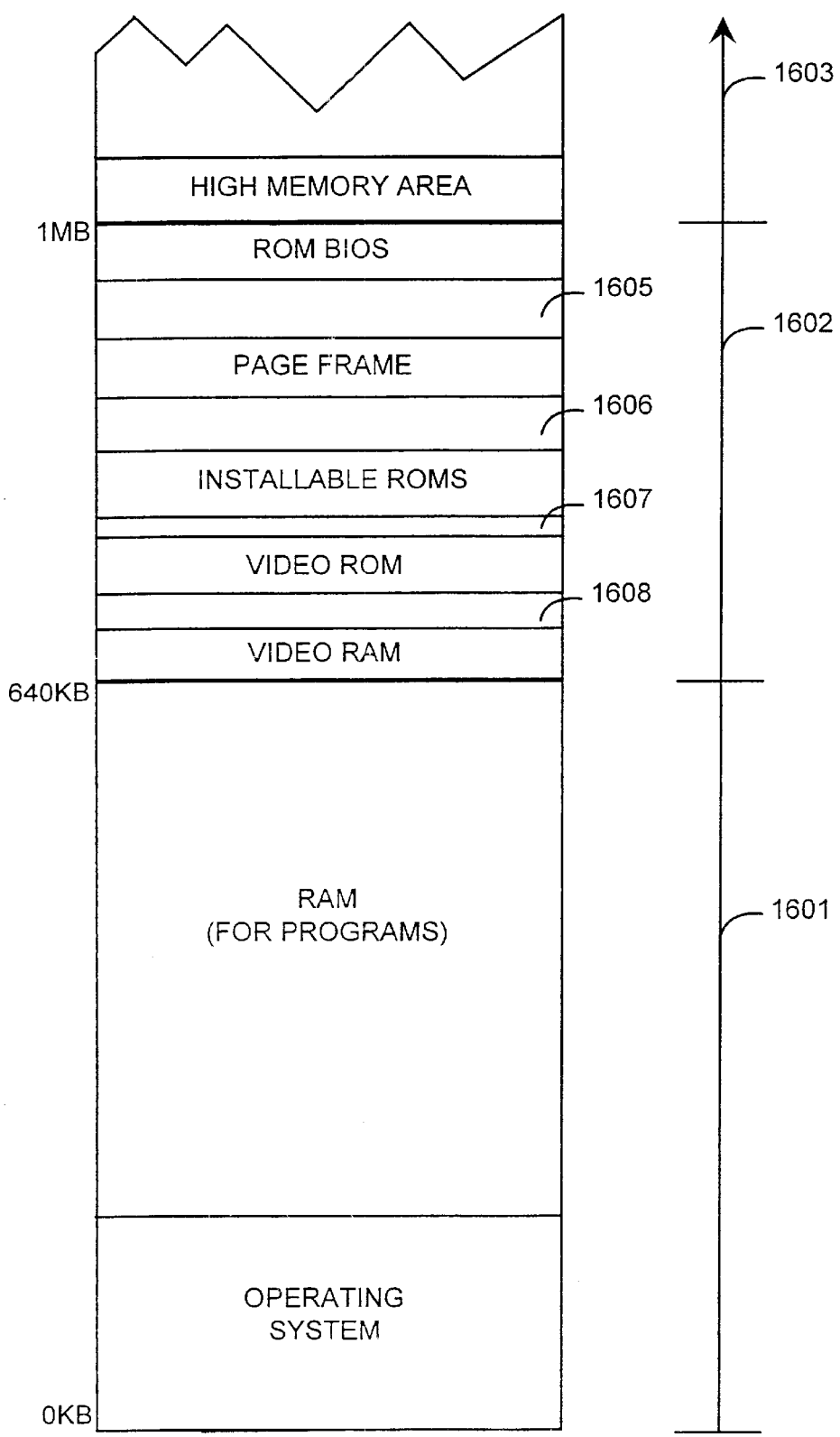
FIG. 16 is a memory map of the RAM of the computer system.

FIG. 16 is a memory map of the RAM of the computer system after processing the CONFIG.SYS file. The RAM is divided into three main areas: conventional memory 1601, upper memory 1602, and extended memory 1603. Conventional memory 1601 extends from 0 KB to 640 KB. Upper memory 1602 is the memory area between 640 KB and 1 MB, and is typically reserved for read only memory (ROM) and hardware device memory. Extended memory 1603 is the memory above 1 MB. The first 64 KB of extended memory are referred to as the high memory area (HMA).

Conventional memory 1601 is where the operating system loads and executes programs. In addition to programs and their data files, conventional memory contains the operating system, device drivers referenced in the CONFIG.SYS file and any memory-resident program specified by the AUTOEXEC.BAT file. BIOS, video memory, hardware device memory, installable ROMs, and ROM BIOS are stored in upper memory 1602.

In MS-DOS and compatible operating systems, it is desirable to have the conventional memory area 1601 have as much free space as possible for use by application programs. To maximize the amount of free space in the conventional memory area 1601, a class of software products called memory managers has evolved. For example, EMM386 by Microsoft Corporation is a software memory manager. Memory managers are installed by the operating system as specified in the CONFIG.SYS file. Memory managers take advantage of 1) paging features of the Intel 80386 and higher numbered CPUs, and 2) the available free space of upper memory 1602. Using paging features of the Intel 80386, these memory managers are able to "map in" RAM from the extended memory 1603 into the unused portions of memory 1605, 1606, 1607, and 1608, thereby creating what are known as upper memory blocks (UMBs). For a more detailed discussion of UMBs, see Gookin, *Managing Memory with DOS* 5 (1991).

The memory managers use a special command to install device drivers and terminate-and-stay resident (TSR) programs into one or more UMBs. In MS-DOS and compatible operating systems, the command DEVICE[HIGH] of the CONFIG.SYS file is used to indicate that a device driver should be installed into a UMB.

Because a compression system may be large, it is desirable to install the compression system into a UMB instead of the conventional memory area 1601. However, the compression system cannot be loaded into a UMB until after a memory manager is loaded during processing of the CONFIG.SYS file. The compression system allows this final placement into a UMB as described below.

Figure 17:
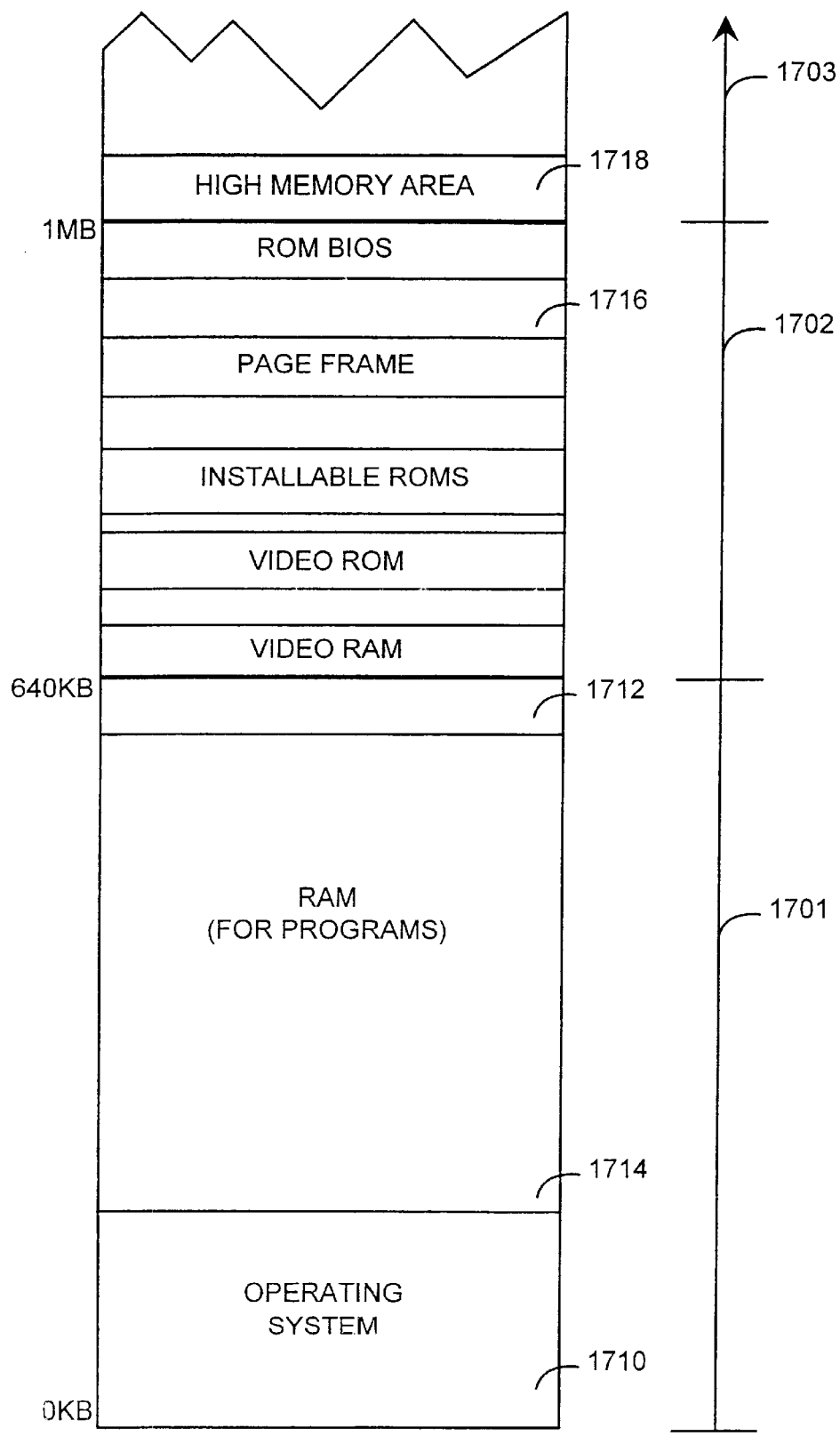
FIG. 17 is a memory map of RAM, showing the initial location, the temporary location, and the three possible final (resident) locations for the compression system.

FIG. 17 is a memory map of RAM, showing the initial location 1710, the temporary location 1712, and the three possible final (resident) locations 1714, 1716, and 1718 for the compression system. The final location 1714 occurs as a result of the compression system code being moved from its temporary location 1712 to the first available free space in conventional memory. The final location 1716 occurs as a result of the compression system code being moved from its temporary location 1712 to a UMB. The final location 1718 occurs as a result of the compression system code being moved to the high memory area. Since the compression system may not know which memory managers are installed, the compression system cannot effectively move to a UMB. Consequently, the compression system includes a file named "DBLSPACE.SYS" for controlling the final placement of the compression system. As shown in Table 3, the following command

DEVICEHIGH=C:\DOS\DBLSPACE.SYS/MOVE can be included in the CONFIG.SYS file to control the final placement of the compression system. Other formats for the command are

DEVICE=C:\DBLSPACE.SYS/MOVE or

DEVICE[HIGH]=C:\DBLSPACE.SYS/MOVE/NOHMA.

These formats control which portions of memory are available for final placement of the compression system. For example, the compression can be loaded into HMA while the stub portion can remain in conventional memory or be moved to a UMB. Alternatively, if no HMA is available, the compression system can be loaded into a UMB or into conventional memory. In a preferred embodiment, the compression system compression/decompression engine can be stored in one portion of memory and the compression system file system can be stored in a different portion of memory. The code in the DBLSPACE.SYS file invokes the functions InquireResidentImageSize and PerformFinalPlacement to place the compression code. The above command can be modified to conform with the syntax of various memory managers. If no memory managers are installed, the compression system preferably selects the final placement.

A preferred method of compressing and decompressing data is described in the patent application "METHOD AND SYSTEM FOR DATA COMPRESSION", Ser. No. 08/031,189, which is incorporated herein by reference.

Although the methods and systems of the present invention have been described in terms of a preferred embodiment, it is not intended that the invention be limited to this embodiment. Modifications within the spirit of the invention will be apparent to those skilled in the art. For example, one skilled in the art would appreciate that the device drivers for other than compression systems (e.g., an encryption system) may be installed in accordance with the present invention. The scope of the present invention is defined only by the claims that follow.

I claim:

1. A device driver for a computer system, the computer system having an operating system, the operating system having a standard device driver and a non-standard device driver, the standard device driver being assigned a drive letter, the device driver comprising:

initializing means, responsive to a request from the operating system, for initializing the device driver including means for assigning a drive letter to the device driver; and swapping means, responsive to an assignment of the drive letter to a non-standard device driver, for swapping the drive letters assigned to the device driver and the non-standard device driver.

2. The device driver of claim 1 including means, responsive to a request from the operating system prior to loading the non-standard device driver, for storing a portion of the device driver at a memory location specified by the operating system.

3. The device driver of claim 1 including means, responsive to a request from the operating system after loading the non-standard device driver, for storing a portion of the device driver at a memory location specified by the operating system.

4. The device driver of claim 1 including identification means for identifying the device driver.

5. The device driver of claim 4 wherein the identification means includes the ASCII characters "," stored at a location 12h within the device driver.

6. The device driver of claim 1 wherein the initialization means is invokable by the operating system through an entry point at location 14h of device driver.

7. The device driver of claim 1 wherein the initialization means and swapping means are stored as a computer program in a file named "DBLSPACE.BIN."

8. A method in a computer system for resolving conflicts between drive letters reserved for a compression system and drive letters expected by non-standard device drivers, the computer system having an operating system for directing the initializing of the computer system, the method comprising the steps of:

reserving a range of a plurality of drive letters for the compression system, the range of drive letters extending from a first drive letter through a reserved number of drive letters;

assigning a drive letter to a non-standard device driver;

adjusting the reserved range of drive letters to extend from the drive letter after the first drive letter; and reassigning the first drive letter to the non-standard device driver.

9. The method of claim 8 including the steps of reassigning a volume previously assigned to the first drive letter to the last drive letter in the adjusted reserved range.

10. A method in a computer system for installing a device driver, the method including the steps of:

installing a standard device driver into the computer system;

after installing the standard device driver, loading the device driver into memory of the computer system, the device driver being loaded from a file with a predefined name and having an initialization function and a swapping function;

invoking the initialization function wherein the initialization function assigns a drive letter for the device driver;

installing a non-standard device driver into the computer system, the non-standard device driver being assigned a device letter; and invoking a swapping function wherein the swapping function swaps the drive letters assigned to the device driver and the non-standard device driver.

11. A method in a computer system for installing a compression system, the computer system having a standard and a non-standard device driver, the non-standard device driver being configured to expect a predefined drive letter assignment, the method including the steps of:

loading a compression system device driver;

assigning the predefined drive letter to the compression system device driver;

installing the non-standard device driver and assigning a drive letter other than the predefined drive letter to the non-standard device driver; and swapping the drive letters assigned to the non-standard device driver and the compression system device driver so that the non-standard device driver is assigned the predefined drive letter.

* * * * *

UNITED STATES PATENT AND TRADEMARK OFFICE
CERTIFICATE OF CORRECTION

PATENT NO. : 6,618,768 B2
DATED : September 9, 2003
INVENTOR(S) : Slivka et al.

It is certified that error appears in the above-identified patent and that said Letters Patent is hereby corrected as shown below:

Column 5,
Line 26, insert -- : -- before "FRST DRIVE"
Line 29, insert -- : -- after "CVF>"
Line 29, insert paragraph break; paragraph should not be indented Column 6,
Table 2, insert space before "Pending Mount List"

Column 11,
Table 3, insert space before "CONFIG. SYS"

Column 12,
Table 4, insert space before "CONFIG. SYS"

Column 13,
Line 45, 'CVFLI" should be -- CVFI --

Signed and Sealed this

Sixth Day of July, 2004

JON W. DUDAS
*Acting Director of the United States Patent and Trademark Office*